(12) United States Patent
Endo et al.

(10) Patent No.: US 11,594,930 B2
(45) Date of Patent: Feb. 28, 2023

(54) ROTATING ELECTRIC MACHINE

(71) Applicant: DENSO CORPORATION, Kariya (JP)

(72) Inventors: Hiroshi Endo, Kariya (JP); Akito Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 135 days.

(21) Appl. No.: 17/235,337

(22) Filed: Apr. 20, 2021

(65) Prior Publication Data

US 2021/0328474 A1 Oct. 21, 2021

(30) Foreign Application Priority Data

Apr. 20, 2020 (JP) .............................. JP2020-075003

(51) Int. Cl.
*H02K 3/28* (2006.01)
*H02K 21/14* (2006.01)

(52) U.S. Cl.
CPC ............... *H02K 3/28* (2013.01); *H02K 21/14* (2013.01); *H02K 2213/03* (2013.01)

(58) Field of Classification Search
CPC ....................................................... H02K 3/28
See application file for complete search history.

(56) References Cited

U.S. PATENT DOCUMENTS

| 2010/0117480 | A1 | 5/2010 | Ishizuka et al. |
| 2011/0012472 | A1 | 1/2011 | Umeda et al. |
| 2011/0198953 | A1 | 8/2011 | Shinohara et al. |
| 2012/0200190 | A1 | 8/2012 | Matsuoka et al. |
| 2012/0228984 | A1 | 9/2012 | Koga |
| 2015/0091408 | A1 | 4/2015 | Azusawa et al. |
| 2016/0248291 | A1 | 8/2016 | Tamura |

FOREIGN PATENT DOCUMENTS

| JP | 2003-264964 A | 9/2003 |
| JP | 2013-081356 A | 5/2013 |
| JP | 2013-099148 A | 5/2013 |

*Primary Examiner* — Ramon M Barrera
(74) *Attorney, Agent, or Firm* — Oliff PLC

(57) ABSTRACT

A rotating electric machine includes a multi-phase armature coil wound on an armature core. The armature coil is formed of electrical conductor groups each being a bundle of electrical conductor segments and having a pair of leg portions and a connecting portion that connects the leg portions. The connecting portion is bent radially with respect to a circumferential direction. The electrical conductor groups are paired such that each pair of the electrical conductor groups consists of a first electrical conductor group and a second electrical conductor group both belonging to a same phase of the armature coil. The circumferential pitch between the leg portions of the first electrical conductor group is greater than that between the leg portions of the second electrical conductor group. In each pair of the electrical conductor groups, the connecting portions of the first and second electrical conductor groups are arranged to axially overlap each other.

11 Claims, 17 Drawing Sheets

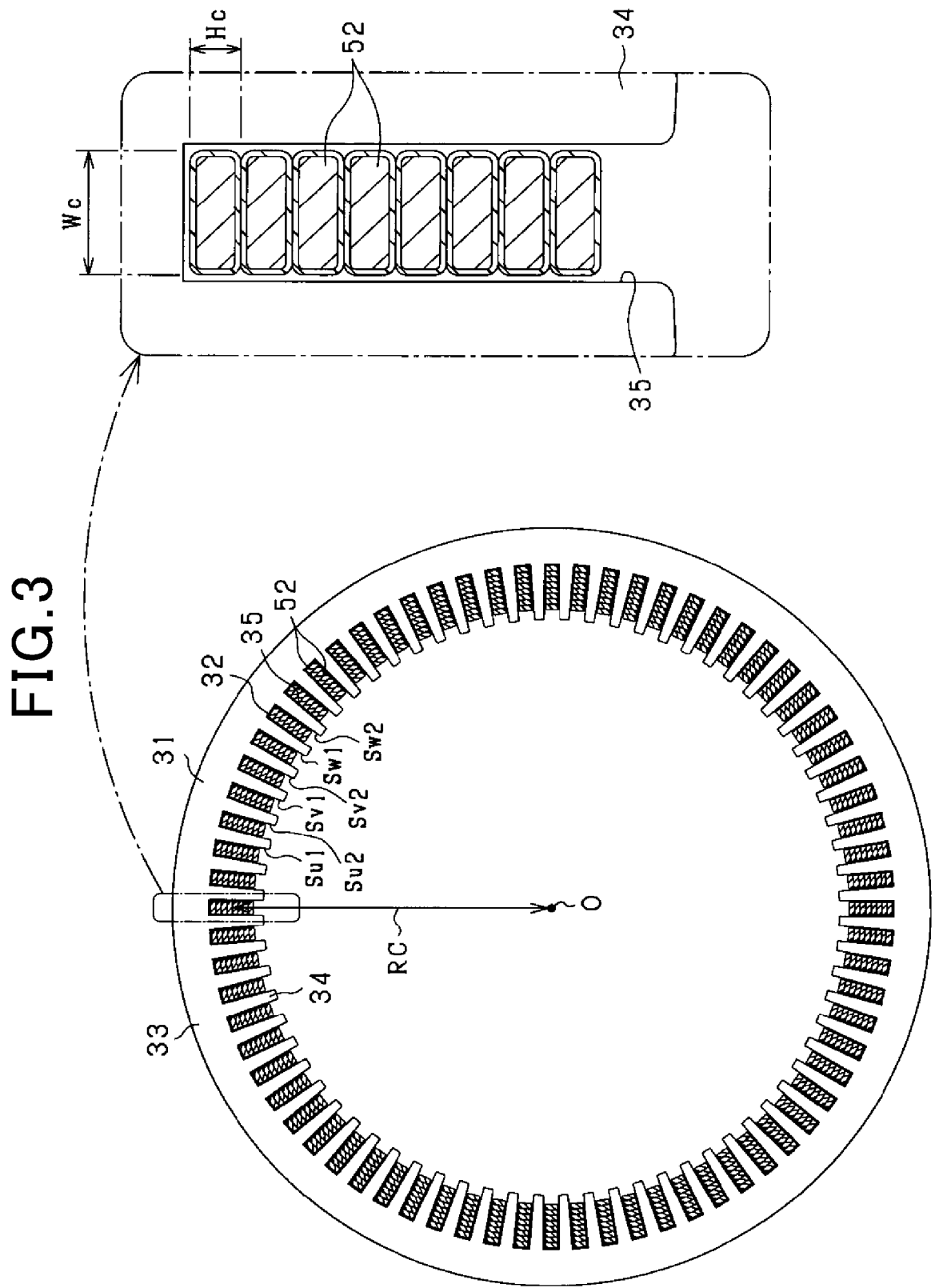

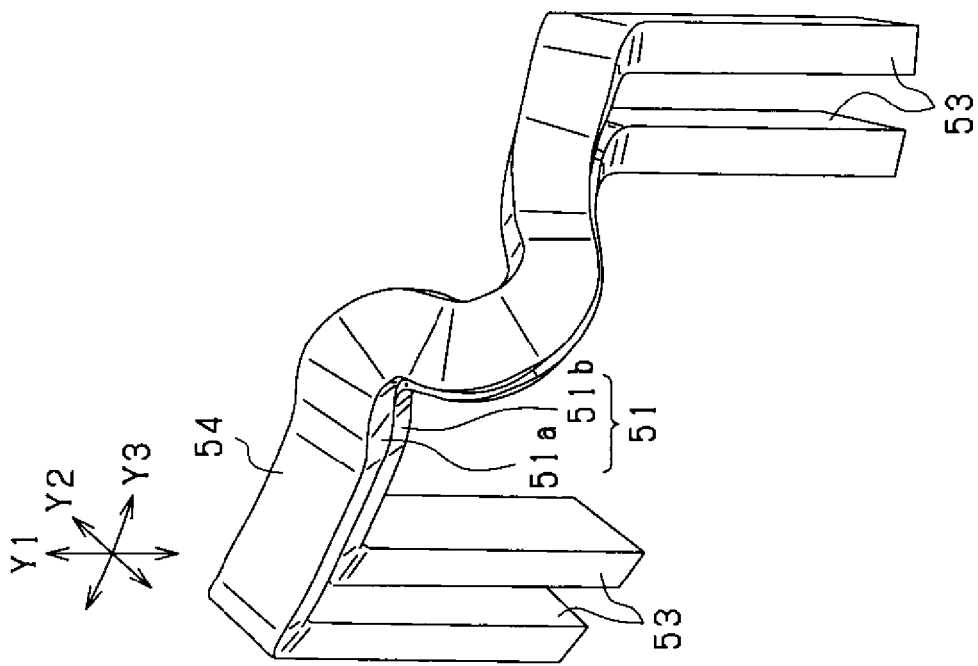
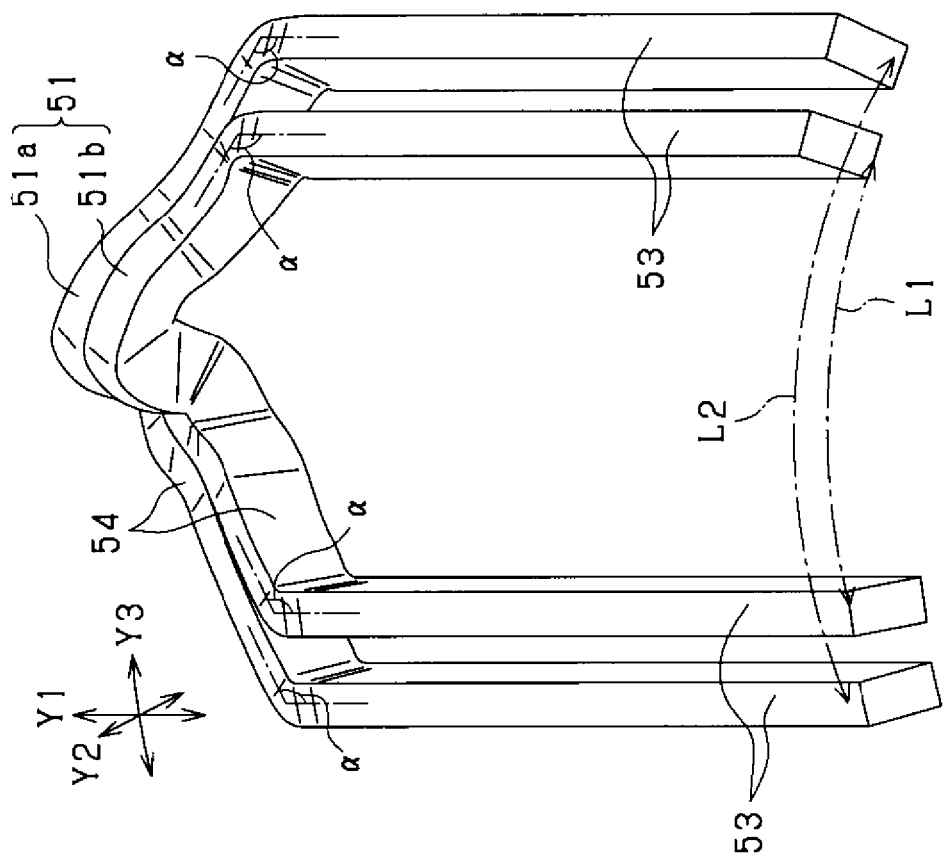

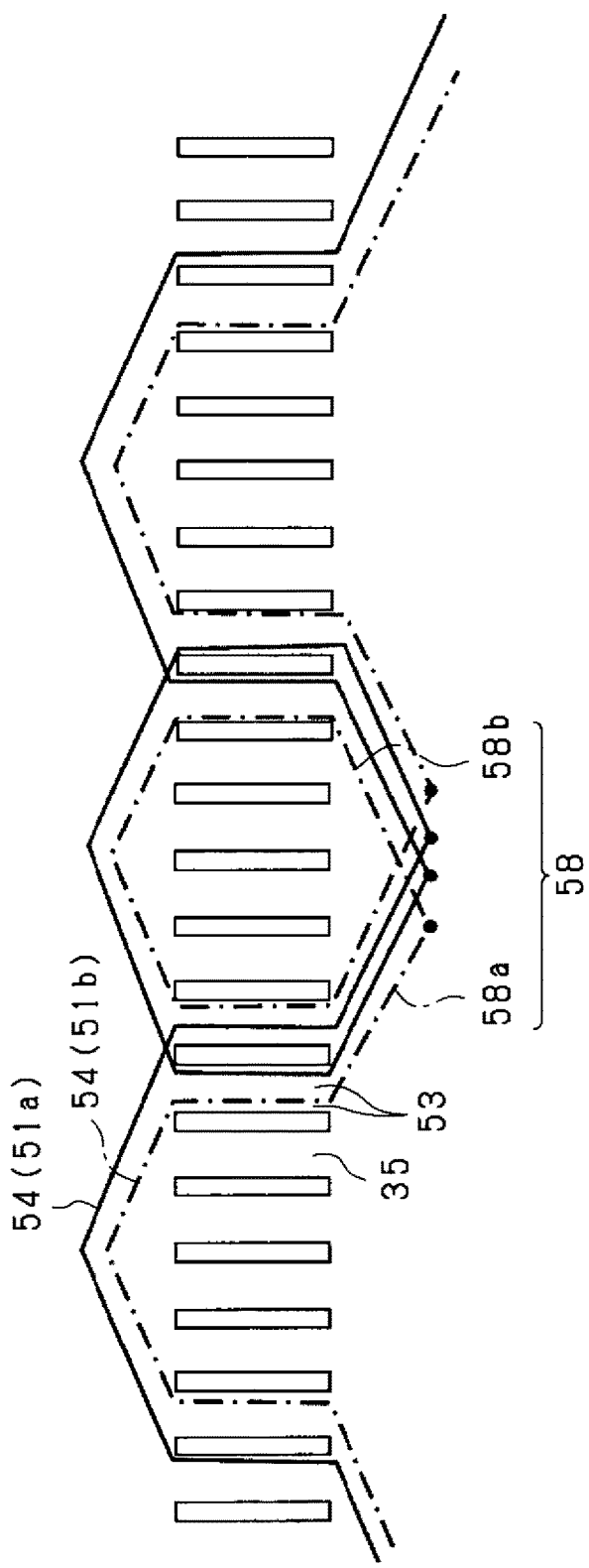

DESIRABLE WAVINESS

DESIRABLE WAVINESS

UNDESIRABLE WAVINESS

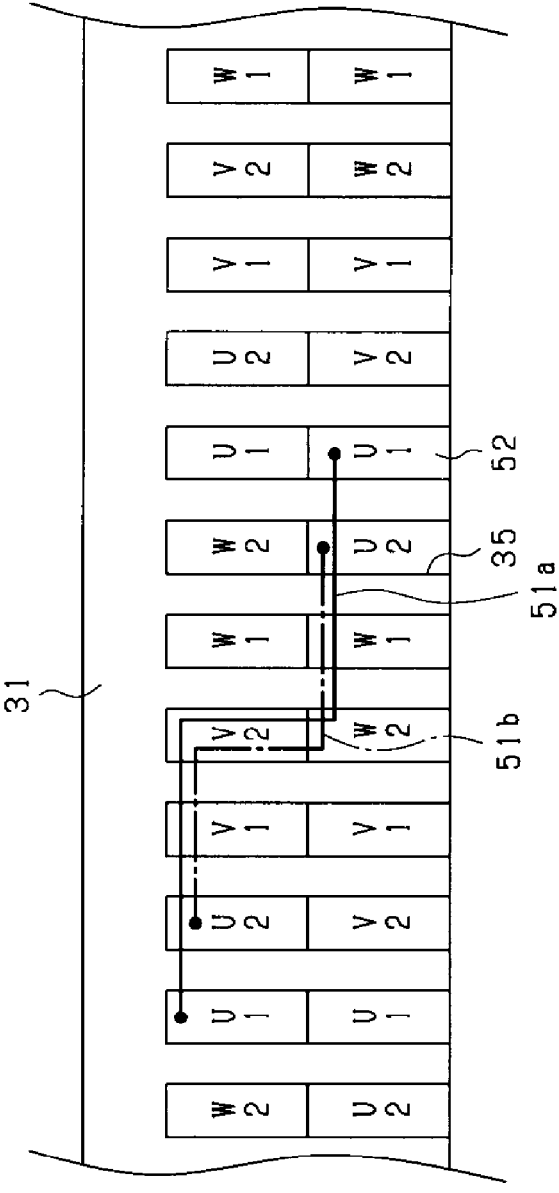
FIG.17A  4-SLOT & 6-SLOT BRIDGING, SHORT-PITCH WINDING
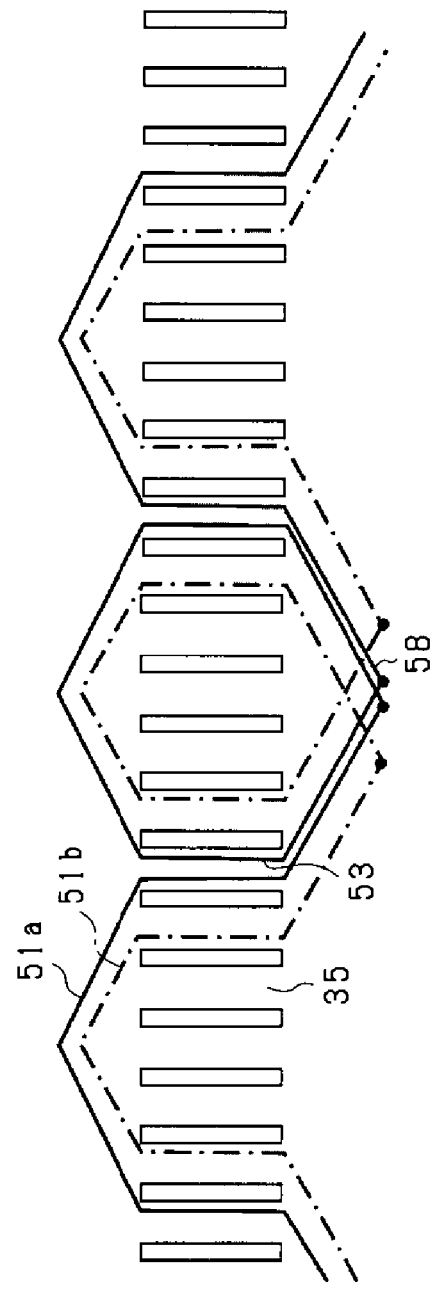
FIG.17B  4-SLOT & 6-SLOT BRIDGING, SHORT-PITCH WINDING

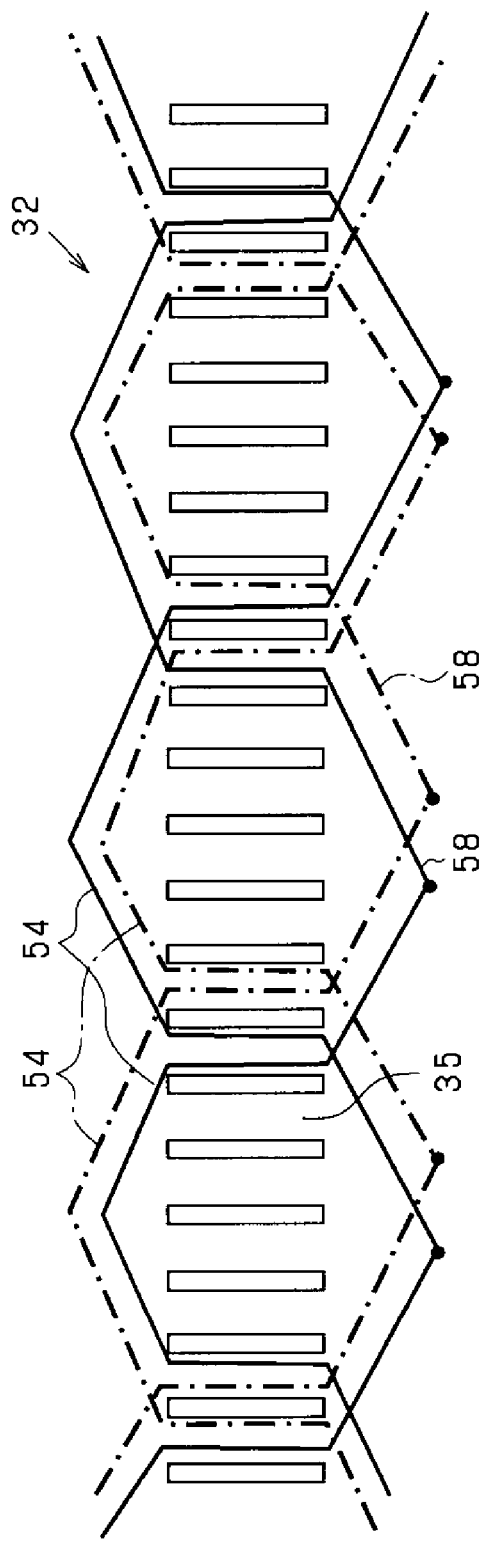
FIG.18A  5-SLOT BRIDGING, FULL-PITCH WINDING
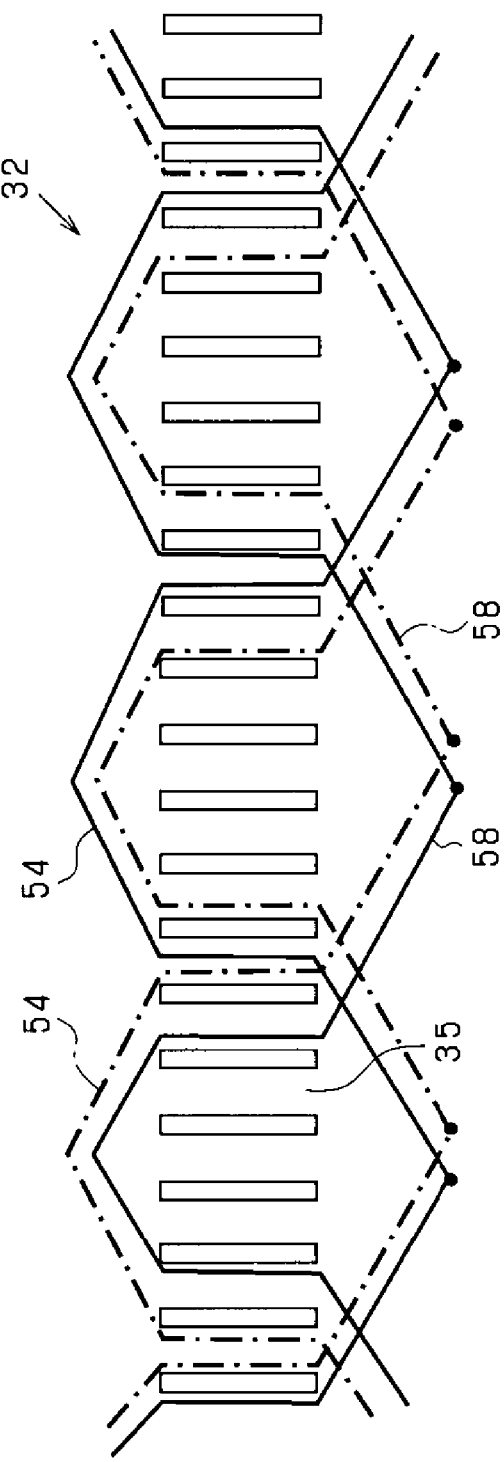
FIG.18B  4-SLOT & 6-SLOT BRIDGING, SHORT-PITCH WINDING

5-SLOT & 7-SLOT BRIDGING, FULL-PITCH WINDING

4-SLOT & 6-SLOT BRIDGING, SHORT-PITCH WINDING

ROTATING ELECTRIC MACHINE

CROSS-REFERENCE TO RELATED APPLICATION

This application is based on and claims priority from Japanese Patent Application No. 2020-075003 filed on Apr. 20, 2020, the entire contents of which are hereby incorporated by reference into this application.

BACKGROUND

1 Technical Field

The present disclosure relates to rotating electric machines.

2 Description of Related Art

There are known rotating electric machines that include an armature having a multi-phase armature coil wound on an armature core. Moreover, there is also known a method of forming the armature coil by: (1) inserting, from one axial side of the armature core, both leg portions of each of substantially U-shaped coil segments into corresponding slots of the armature core; and (2) joining each corresponding pair of those parts of the leg portions of the coil segments which protrude outside the corresponding slots on the other axial side of the armature core.

More specifically, according to the known method, a substantially S-shaped part is formed in a head portion of each of the coil segments, thereby reducing the circumferential dimension of a crossing region where the head portion radially crosses a coil end of the armature coil. Consequently, it is possible to compactly overlap the head portions of the coil segments extending respectively from adjacent ones of the slots of the armature core, thereby reducing the size of the coil end of the armature coil.

SUMMARY

According to the present disclosure, there is provided a rotating electric machine which includes an armature. The armature includes an annular armature core and a multi-phase armature coil wound on the armature core. The armature core has a plurality of slots arranged in a circumferential direction thereof. The armature coil is formed of a plurality of electrical conductor groups connected with one another. Each of the plurality of electrical conductor groups is constituted of a bundle of a plurality of electrical conductor segments. Moreover, each of the plurality of electrical conductor groups is substantially U-shaped to have a pair of leg portions and a connecting portion. The pair of leg portions are respectively received in a corresponding pair of the slots of the armature core and located at different radial positions in the corresponding slots. The connecting portion extends on one axial side of the armature core to connect the pair of leg portions. The connecting portion has a bent part that is bent radially with respect to the circumferential direction. The plurality of electrical conductor groups are paired such that each pair of the electrical conductor groups consists of a first electrical conductor group and a second electrical conductor group that both belong to a same phase of the armature coil. The circumferential pitch between the pair of leg portions of the first electrical conductor group is greater than the circumferential pitch between the pair of leg portions of the second electrical conductor group. In each pair of the electrical conductor groups, the connecting portions of the first and second electrical conductor groups are arranged to axially overlap each other.

BRIEF DESCRIPTION OF THE DRAWINGS

FIG. 3 is a schematic diagram illustrating the configuration of a stator core and a stator coil of the stator.

FIGS. 4A and 4B are perspective views showing, respectively from opposite sides in an axial direction, a pair of first and second electrical conductor groups for forming the stator coil.

FIG. 13 is a schematic diagram illustrating the connection pattern of a U-phase winding of the stator coil.

FIGS. 17A and 17B are schematic diagrams together illustrating an example where each phase winding of the stator coil is configured as a short-pitch winding wound in a wave-lap winding manner according to a third modification.

FIG. 18A is a schematic diagram illustrating an example where each phase winding of the stator coil is configured as a wave-wound full-pitch winding according to the third modification.

FIG. 18B is a schematic diagram illustrating an example where each phase winding of the stator coil is configured as a wave-wound short-pitch winding according to the third modification.

DESCRIPTION OF EMBODIMENTS

Figure 1:
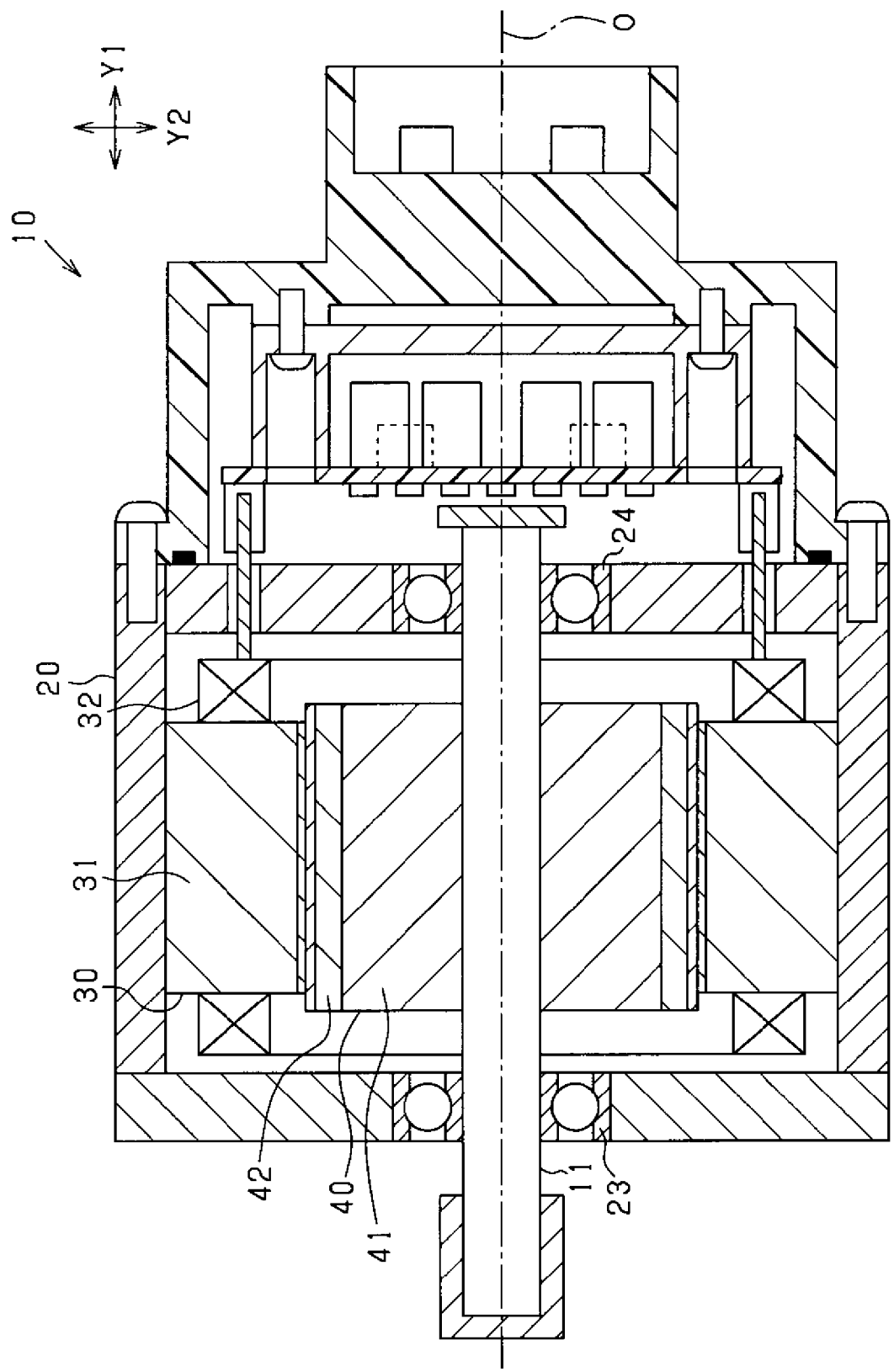
FIG. 1 is a cross-sectional view of a rotating electric machine according to an exemplary embodiment.

The inventors of the present application have found the following problems with the known rotating electric machines. That is, in practice, it may be desired to change, according to the required performances, the design specifications of the rotating electric machines, such as reducing the outer diameter of the armature, increasing the number of the slots formed in the armature core, increasing the thickness of the coil segments or increasing the number of the coil segments. In this case, even with the known armature coil forming method (see, for example, Japanese Patent No. JP 5702179 B2), there would still be a limit in reduction of the circumferential dimension of the crossing region of the head portion of each coil segment; thus it might be impossible to flexibly make changes to the design specifications of the rotating electric machines.

In contrast, with the configuration of the above-described rotating electric machine according to the present disclosure, it becomes possible to provide a greater clearance between each circumferentially-adjacent pair of the connecting portions of the electrical conductor groups than in the case of arranging the connecting portions of the first and second electrical conductor groups not to axially overlap each other. Consequently, it becomes easier to change the design specifications of the rotating electric machine, such as reducing the outer diameter of the armature, increasing the number of the slots formed in the armature core, increasing the thickness of the electrical conductor segments or increasing the number of the electrical conductor segments included in each of the electrical conductor groups.

Moreover, with the configuration of the above-described rotating electric machine according to the present disclosure, it becomes possible to reduce the clearance between each axially-adjacent pair of the connecting portions of the electrical conductor groups and thereby reduce the size of a coil end of the armature coil than in the case of arranging the connecting portions of the first and second electrical conductor groups not to axially overlap each other. Here, the coil end is constituted of all the connecting portions of the electrical conductor groups.

Furthermore, to arrange the connecting portions of the first and second electrical conductor groups to axially overlap each other, the electrical conductor groups are bent in the same manner at the connecting portions. Consequently, it becomes possible to prevent interference from occurring between each adjacent pair of the connecting portions of the electrical conductor groups.

In addition, since the connecting portions of the first and second electrical conductor groups, which are arranged to axially overlap each other, belong to a same phase of the armature coil, it becomes possible to suppress electric discharge from occurring even when the first and second electrical conductor groups are accidently brought into contact with each other.

In further implementations, for each of the electrical conductor groups, the electrical conductor segments constituting the electrical conductor group may be arranged, at the pair of leg portions of the electrical conductor group, in a predetermined arrangement sequence in a radial direction so as to be radially aligned with each other in the corresponding slots of the armature core. At the connecting portion of the electrical conductor group, the electrical conductor segments constituting the electrical conductor group are arranged parallel to each other keeping the arrangement sequence of the electrical conductor segments at the pair of leg portions of the electrical conductor group in the corresponding slots.

With the above arrangement, the electrical conductor segments may be bent in the same manner, thereby facilitating the manufacture of the armature. Moreover, the electrical conductor segments may be arranged along the circumferential direction at the connecting portion, thereby reducing the axial width of the connecting portion.

The bent parts of the connecting portions of the first electrical conductor groups may be arranged in alignment with each other in the circumferential direction. The circumferential pitch between the bent parts of the connecting portions of the first electrical conductor groups may be set to be greater than or equal to the circumferential pitch between the slots of the armature core and less than or equal to twice the circumferential pitch between the slots. The bent parts of the connecting portions of the second electrical conductor groups may also be arranged in alignment with each other in the circumferential direction. The circumferential pitch between the bent parts of the connecting portions of the second electrical conductor groups may also be set to be greater than or equal to the circumferential pitch between the slots of the armature core and less than or equal to twice the circumferential pitch between the slots.

With the above arrangement, it becomes possible to reduce the axial width of the coil end which is constituted of all the connecting portions of the electrical conductor groups.

For each of the electrical conductor groups, one of the pair of leg portions of the electrical conductor group may be received in a radially outer part of one corresponding slot of the armature core and the other of the pair of leg portions may be received in a radially inner part of another corresponding slot of the armature core. For each of the electrical conductor groups, there may be formed, in the bent part of the connecting portion of the electrical conductor group, a radially-extending part which extends along a radial direction and in which the electrical conductor segments constituting the electrical conductor group are arranged in alignment with each other in the circumferential direction. The radially-extending parts of the connecting portions of the first electrical conductor groups may be arranged in alignment with each other in the circumferential direction; the radially-extending parts of the connecting portions of the second electrical conductor groups may be arranged in alignment with each other in the circumferential direction. The following relationship is satisfied: $Rc \times 2 \times \pi/S \leq N \times Hc \leq Rc \times 2 \times \pi/(S/2)$, where Rc is the distance from a central axis of the armature core to a radial center of each of the slots, S is the number of the slots formed in the armature core, N is the number of the electrical conductor segments included in each of the electrical conductor groups, and Hc is a radial thickness of each of the electrical conductor segments in the corresponding slots of the armature core.

With the above configuration, it becomes possible to more effectively reduce the axial width of the coil end which is constituted of all the connecting portions of the electrical conductor groups.

A clearance may be provided between each circumferentially-adjacent pair of the bent parts of the connecting portions of the electrical conductor groups.

The bent parts of the connecting portions are generally formed by bending the electrical conductor segments. Therefore, at the bent parts of the connecting portions, it is easier for large strain to be induced and for the insulating coats of the electrical conductor segments to be damaged than at the other parts of the connecting portions. However, with the clearance provided between each circumferentially-adjacent pair of the bent parts of the connecting portions of the electrical conductor groups, it will still be possible to ensure electrical insulation between different phases of the armature coil.

For each of the electrical conductor groups, one of the pair of leg portions of the electrical conductor group may be received in a radially outer part of one corresponding slot of the armature core and the other of the pair of leg portions may be received in a radially inner part of another corresponding slot of the armature core. The following relationship may be satisfied: $Wc \times 2 < Hc \times N$, where Wc is a circumferential width of each of the electrical conductor segments in the corresponding slots of the armature core, Hc is a radial thickness of each of the electrical conductor segments in the corresponding slots of the armature core, and N is the number of the electrical conductor segments included in each of the electrical conductor groups.

With the above configuration, it becomes possible to more effectively reduce the axial width of the connecting portions of the electrical conductor groups.

The armature coil may be a three-phase coil having three phase windings star-connected to define a neutral point therebetween. The first and second electrical conductor groups forming a same one of the phase windings of the armature coil may be connected in series with each other. The first electrical conductor groups may be connected closer to the neutral point than the second electrical conductor groups are.

With the above configuration, the second electrical conductor groups are higher in electric potential than the first electrical conductor groups. Moreover, as described above, in each pair of the electrical conductor groups, the second electrical conductor group is located axially inside and covered by the first electrical conductor group. Consequently, it becomes possible to secure a sufficient distance from the second electrical conductor group to other electrical conductor groups belonging to a different phase of the armature coil from the second electrical conductor group, thereby improving the insulation properties of the armature coil.

At the connecting portions of each pair of the electrical conductor groups, an axially-inner side surface of the first electrical conductor group and an axially-outer side surface of the second electrical conductor group may be arranged in surface contact with each other.

With the above arrangement, it is possible to secure a larger contact area between the axially-inner side surface of the first electrical conductor group and the axially-outer side surface of the second electrical conductor group than in the case of arranging them in point contact or line contact with each other. Consequently, it is possible to suppress damage to the insulating coats of the electrical conductor segments constituting the first and second electrical conductor groups due to contact between the connecting portions.

Each of the electrical conductor segments may include a main body formed of an electrically-conductive material and an insulating coat covering the surface of the main body. The insulating coat may be formed of an electrically-insulative material with voids formed therein.

With the above configuration, when the insulating coats of the electrical conductor segments are subjected to, for example, external force or vibration, the voids formed in the insulating coats may collapse, thereby considerably deteriorating the insulation properties of the insulating coats. However, as described above, the connecting portions of each pair of the electrical conductor groups are arranged to axially overlap each other; between each circumferentially-adjacent pair of the bent parts of the connecting portions of the electrical conductor groups, there is provided the clearance. Consequently, though the insulating coat is formed of the electrically-insulative material with voids formed therein, it is still possible to secure the insulation properties of the insulating coats.

At the connecting portions of each pair of the electrical conductor groups, the electrical conductor segments constituting the first electrical conductor group may be respectively axially opposed to and spaced at a substantially constant interval from the electrical conductor segments constituting the second electrical conductor group.

With the above arrangement, it is possible to prevent damage to the insulating coats of the electrical conductor segments while suppressing increase in the axial width of the coil end which is constituted of all the connecting portions of the electrical conductor groups.

Each of the electrical conductor groups may be constituted of a bundle of three electrical conductor segments. The armature coil may be a three-phase coil having three phase windings star-connected together. Each of the phase windings of the armature coil may include four winding units connected in parallel with each other and each including one pair of the first and second electrical conductor groups connected in series with each other. The plurality of slots of the armature core may be comprised of pairs of same-phase slots. Each pair of the same-phase slots consists of two circumferentially-adjacent slots corresponding to a same one of the phase windings of the armature coil. In each pair of the same-phase slots, there may be arranged the four winding units forming the corresponding phase winding of the armature coil such that the number of the leg portions of the electrical conductor groups of the four winding units received in one of the pair of the same-phase slots is equal to the number of the leg portions of the electrical conductor groups of the four winding units received in the other of the pair of the same-phase slots.

With the above arrangement, the four winding units can be evenly received in the pair of the same-phase slots, thereby securing electromagnetic balance and suppressing circulating current in the armature.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

FIG. 1 shows the overall structure of a rotating electric machine according to an exemplary embodiment.

In the present embodiment, the rotating electric machine is configured as an electric motor 10 for use in a vehicle. Specifically, the electric motor 10 is a three-phase permanent magnet synchronous motor. That is, the electric motor 10 is a brushless motor. In addition, the electric motor 10 may include either only one three-phase coil belonging to a single system or two three-phase coils respectively belonging to two systems.

As shown in FIG. 1, the electric motor 10 includes a housing 20, a stator 30 that is fixed to the housing 20 and functions as an armature in the present embodiment, a rotor 40 configured to rotate relative to the stator 30, and a rotating shaft 11 on which the rotor 40 is fixed.

In addition, hereinafter, the direction in which a central axis O of the rotating shaft 11 extends will be referred to as the axial direction (indicated by a double-headed arrow Y1 in the drawings); the directions of extending radially from the central axis O of the rotating shaft 11 will be referred to as radial directions (indicated by a double-headed arrow Y2 in the drawings); and the direction of extending along a circle whose center is on the central axis O of the rotating shaft 11 will be referred to as the circumferential direction (indicated by a double-headed arrow Y3 in the drawings).

The housing 20 is cylindrical-shaped and has both the stator 30 and the rotor 40 received therein. In the housing 20, there are provided a pair of bearings 23 and 24 by which the rotating shaft 11 is rotatably supported. In addition, the axis of an inner circumferential surface of the housing 20 coincides with the central axis O of the rotating shaft 11.

The rotor 40 constitutes part of a magnetic circuit formed in the electric motor 10. The rotor 40 has one or more pairs of magnetic poles arranged in the circumferential direction and is radially opposed to the stator 30. More particularly, in the present embodiment, the rotor 40 has twelve magnetic poles (i.e., the number of magnetic pole pairs of the rotor 40 is equal to 6). In addition, the number of the magnetic poles of the rotor 40 may alternatively be set to other values according to the design specifications of the electric motor 10.

The rotor 40 includes a rotor core 41 formed of a magnetic material and permanent magnets 42 fixed to the rotor core 41.

More particularly, in the present embodiment, the rotor 40 includes twelve permanent magnets 42 whose polarities are alternately different in the circumferential direction. The permanent magnets 42 are embedded respectively in twelve magnet-receiving holes each of which is formed in the rotor core 41 along the axial direction. That is, in the present embodiment, the rotor 40 is configured as an IPM (Interior Permanent Magnet) rotor. As an alternative, the rotor 40 may be configured as an SPM (Surface Permanent Magnet) rotor. As another alternative, the rotor 40 may be configured as a field coil type rotor.

In a center hole of the rotor core 41, there is fixedly inserted the rotating shaft 11 so that the rotor 40 can rotate together with the rotating shaft 11 about the central axis O of the rotating shaft 11.

The stator 30 is cylindrical-shaped and arranged in a substantially axially-central part of the housing 20 along the inner periphery of the housing 20. Moreover, the stator 30 is fixed to the inner circumferential surface of the housing 20 so that a central axis of the stator 30 coincides with the central axis O of the rotating shaft 11.

Figure 2:
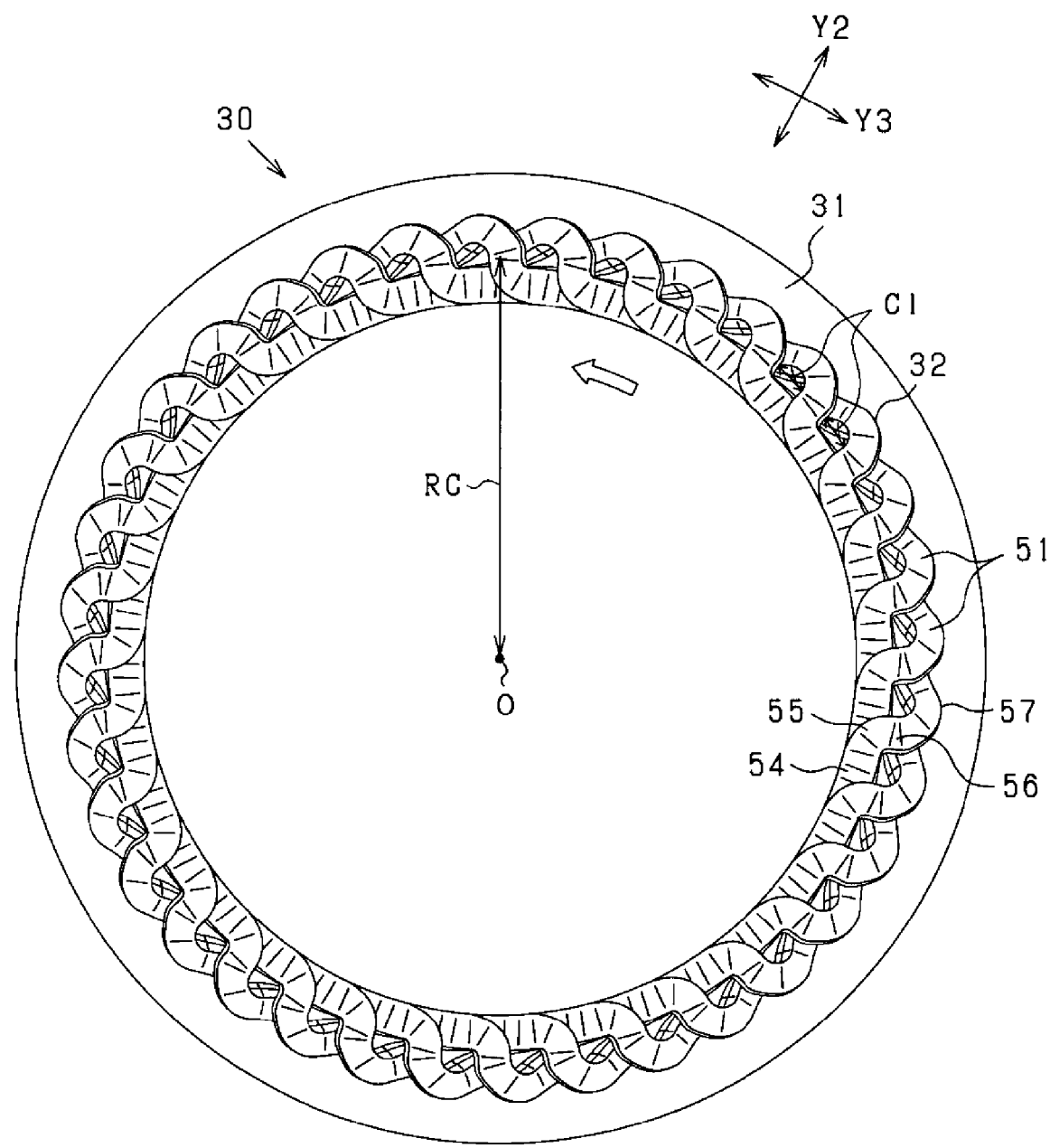
FIG. 2 is a plan view of a stator of the rotating electric machine.

The stator 30 also constitutes part of the magnetic circuit formed in the electric motor 10. As shown in FIG. 2, the stator 30 has an annular stator core (or armature core) 31 arranged radially outside the rotor 40 so as to radially face the rotor 40 and a three-phase stator coil (or armature coil) 32 wound on the stator core 31.

It should be noted that in showing the stator coil 32 in the drawings, of edge lines which represent boundaries between surfaces having different orientations, only those which are particularly important for expressing the three-dimensional shape of the stator coil 32 are depicted. In addition, it also should be noted that those of the edge lines which represent the radially outer contour of the stator coil 32 are depicted with solid lines in the drawings.

As shown in FIG. 3, the stator core 31 includes an annular back yoke (or back core) 33 and a plurality of teeth 34 arranged at predetermined intervals in the circumferential direction and each protruding radially inward from the back yoke 33. Between each circumferentially-adjacent pair of the teeth 34, there is formed one slot 35. That is, in the stator core 31, there are formed a plurality of slots 35 at equal intervals in the circumferential direction. The stator coil 32 is wound on the teeth 34 so as to be received in the slots 35. In addition, the number of teeth 34 is equal to the number of the slots 35.

In the present embodiment, the number of the slots 35 (or the number of the teeth 34) per magnetic pole of the rotor 40 that has the twelve magnetic poles and per phase of the three-phase stator coil 32 is equal to 2. In other words, the slot multiplier number is equal to 2. Accordingly, the total number of the slots 35 formed in the stator core 31 is equal to 72 (i.e., 2×12×3). In addition, the 72 slots 35 are comprised of pairs of U-phase slots Su1 and Su2, V-phase slots Sv1 and Sv2 and W-phase slots Sw1 and Sw2 which are sequentially and repeatedly arranged in the circumferential direction (see FIG. 12A).

In the present embodiment, the stator core 31 is constituted of a laminate that is formed by laminating a plurality of annular magnetic steel sheets (or core sheets) in the axial direction. In addition, the stator core 31 may alternatively be constituted of a plurality of stator core segments that are arranged to adjoin one another in the circumferential direction.

Figure 14:
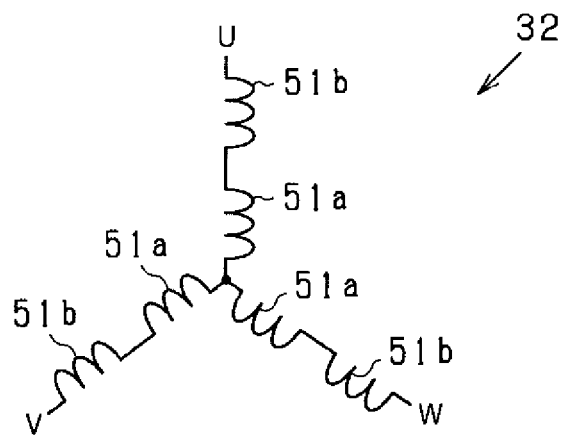
FIG. 14 is a schematic circuit diagram of the stator coil.

The stator coil 32 is composed of U-phase, V-phase and W-phase windings that are star-connected (or Y-connected) to define a neutral point therebetween (see FIG. 14). In operation, the stator coil 32 generates magnetic flux upon being supplied with three-phase AC power.

In the present embodiment, the stator coil 32 is formed by inserting, from a first axial side of the stator core 31, a plurality of substantially U-shaped electrical conductor segments 52 into the slots 35 of the stator core 31 and joining each corresponding pair of end portions of the electrical conductor segments 52 which protrude outside the slots 35 on a second axial side of the stator core 31. Each of the electrical conductor segments 52 is obtained by cutting and plastically deforming an electrical conductor, which has a substantially rectangular cross-sectional shape and a constant thickness, into the substantially "U" shape.

Specifically, in the present embodiment, as shown in FIGS. 4A and 4B, each of the phase windings of the stator coil 32 is formed of a plurality of substantially U-shaped electrical conductor groups 51. The electrical conductor groups 51 include two types of electrical conductor groups 51 having different sizes and paired to overlap one another. Each pair of the electrical conductor groups 51 consists of a first electrical conductor group 51a located on the outer side and a second electrical conductor group 51b located on the inner side. For each pair of the electrical conductor groups 51, both the first and second electrical conductor groups 51a and 51b of the pair are connected to a same one of U-phase, V-phase and W-phase terminals so as to belong to a same one of the U, V and W phases of the stator coil 32. In addition, FIGS. 4A and 4B are perspective views showing one pair of the first and second electrical conductor groups 51a and 51b respectively from opposite sides in the axial direction before they are mounted to the stator core 31.

Figure 5B:
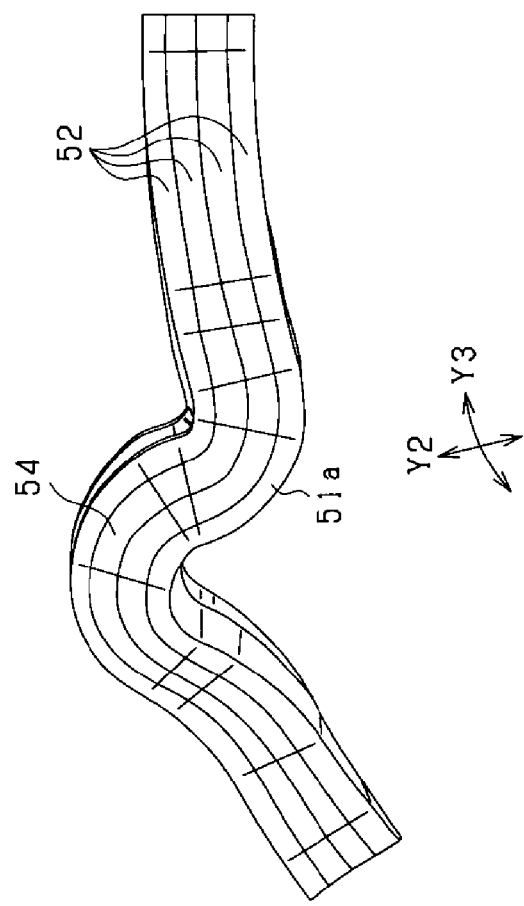
FIGS. 5A and 5B are perspective views showing the pair of first and second electrical conductor groups respectively from a radial side and an axial side thereof.
Figure 5A:
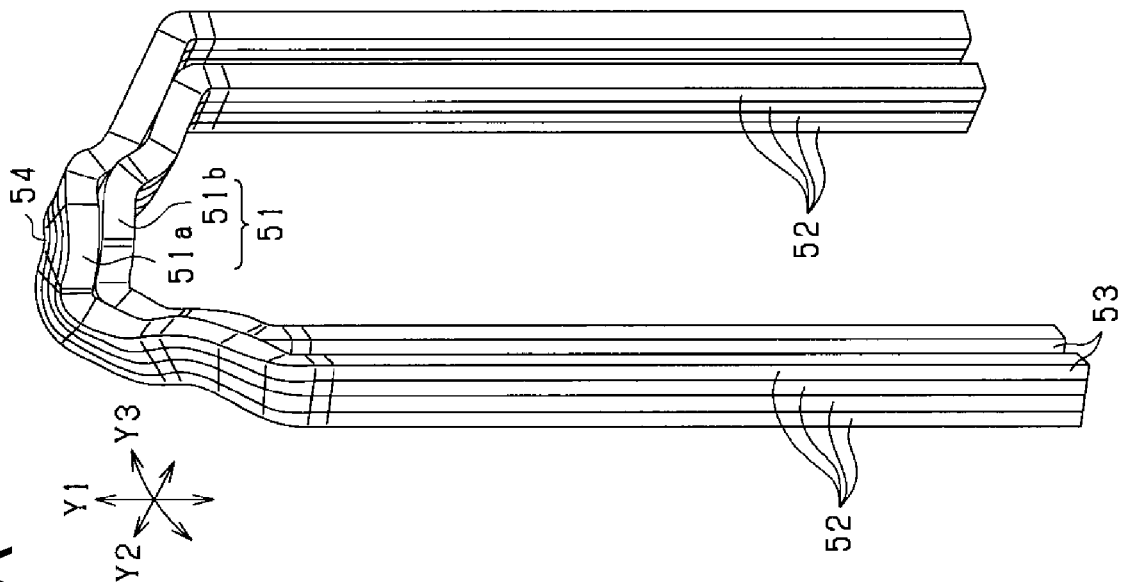

Moreover, as shown in FIGS. 5A and 5B, each of the electrical conductor groups 51 consists of a plurality (e.g., four in the present embodiment) of substantially U-shaped electrical conductor segments 52 that are bundled together. In addition, FIGS. 5A and 5B are perspective views showing one pair of the first and second electrical conductor groups 51a and 51b respectively from a radial side and an axial side of them before they are mounted to the stator core 31. Moreover, it should be noted that for the sake of simplicity, the electrical conductor segments 52 of each of the electrical conductor groups 51 are not individually depicted in the drawings except for FIGS. 5A and 5B.

As shown in FIG. 3, the electrical conductor segments 52 have a substantially rectangular cross-sectional shape. In each of the slots 35 of the stator core 31, the electrical conductor segments 52 are radially aligned in a row such that the longer sides of rectangular cross sections of the electrical conductor segments 52 radially face each other.

Referring to FIG. 3, in the present embodiment, each of the electrical conductor groups 51 is configured to satisfy the following relationship: Wc×2<Hc×N, where Wc is the circumferential width of each of the electrical conductor segments 52 in the corresponding slots 35 of the stator core 31, Hc is the radial thickness of each of the electrical conductor segments 52 in the corresponding slots 35 of the stator core 31, and N is the number of the electrical conductor segments 52 included in each of the electrical conductor groups 51.

Moreover, in the present embodiment, each of the electrical conductor groups 51 is formed by bending the electrical conductor segments 52 of the group 51, which are in a state of being bundled together, into the substantially "U" shape using shaping dies.

Figure 6:
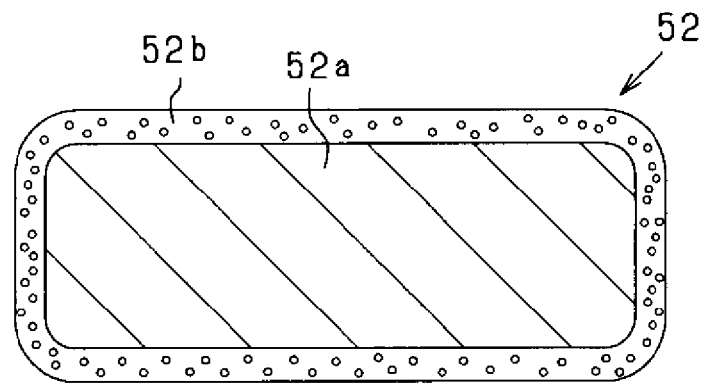
FIG. 6 is an enlarged cross-sectional view of an electrical conductor segment.

As shown in FIG. 6, each of the electrical conductor segments 52 includes a main body 52a formed of an electrically-conductive material (e.g., copper) and an insulating coat 52b covering the surface of the main body 52a. In the present embodiment, the insulating coat 52b is formed of an electrically-insulative material (e.g., resin) with voids formed therein.

As shown in FIGS. 4 and 5, each of the electrical conductor groups 51 has a pair of straight portions (or leg portions) 53 to be respectively received in a pair of the slots 35 circumferentially apart from each other by a predetermined pitch and a turn portion (or connecting portion) 54 connecting the pair of straight portions 53.

The straight portions 53 are formed to extend straight in the axial direction. The straight portions 53 are parallel to and spaced by a predetermined distance from each other. The axial length of the straight portions 53 is set to be larger than the axial length of the stator core 31. Each of the straight portions 53 is received in a corresponding one of the slots 35 of the stator core 31 with both ends thereof axially protruding from the corresponding slot 35. Moreover, the pitch L1 between the straight portions 53 of the first electrical conductor group 51a is set to be greater than the pitch L2 between the straight portions 53 of the second electrical conductor group 51b.

For each of the electrical conductor groups 51 (i.e., the first and second electrical conductor groups 51a and 51b), the pair of straight portions 53 of the electrical conductor group 51 are respectively received in the corresponding slots 35 of the stator core 31 so as to be different in radial position from each other. More specifically, as shown in FIGS. 12A and 12B, one of the pair of straight portions 53 is received in a radially outer part of one corresponding slot 35 of the stator core 31 while the other of the pair of straight portions 53 is received in a radially inner part of another corresponding slot 35 of the stator core 31.

Moreover, for each of the electrical conductor groups 51, the electrical conductor segments 52 constituting the electrical conductor group 51 are arranged, at the pair of straight portions 53 of the electrical conductor group 51, in a predetermined arrangement sequence in the radial direction so as to be radially aligned with each other in the corresponding slots 35. For example, at one of the pair of straight portions 53 shown in FIG. 12(B), the electrical conductor segments 52 are arranged in the sequence of U1a→U1b→U1c→U1d from the radially inner side in the corresponding slot 35; at the other of the pair of straight portions 53 shown in FIG. 12(B), the electrical conductor segments 52 are also arranged in the sequence of U1a→U1b→U1c→U1d from the radially inner side in the corresponding slot 35.

Figure 7:
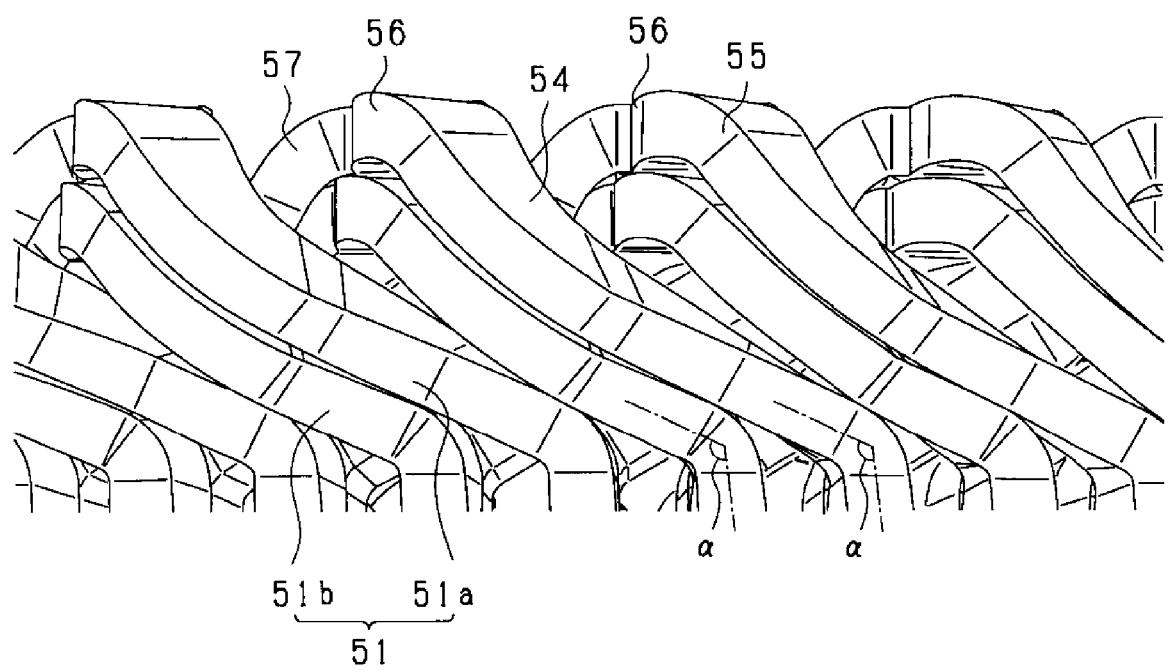
FIG. 7 is an enlarged perspective view of turn portions of electrical conductor groups forming the stator coil.

As shown in FIGS. 2 and 4A-4B, in each of the electrical conductor groups 51 (i.e., the first and second electrical conductor groups 51a and 51b), the turn portion 54 is formed to extend in the circumferential direction and connected at its circumferential ends with axial ends of the straight portions 53. Moreover, as shown in FIG. 7, the turn portion 54 is formed to have the shape of a ridge that is higher at its circumferential center than at its circumferential ends. The circumferential end parts of the turn portion 54 are connected respectively with the straight portions 53 so as to be oblique at a predetermined angle to the extending direction of the straight portions 53 (or the axial direction). More specifically, as shown in FIGS. 4A and 7, each of the circumferential end parts of the turn portion 54 is oblique to the extending direction of the straight portions 53 (or the axial direction) such that an angle α between the circumferential end part and the extending direction of the straight portions 53 is equal to the predetermined angle (e.g., about 120°). In addition, the predetermined angle is set to be equal for both the first and second electrical conductor groups 51a and 51b.

Figure 12A:
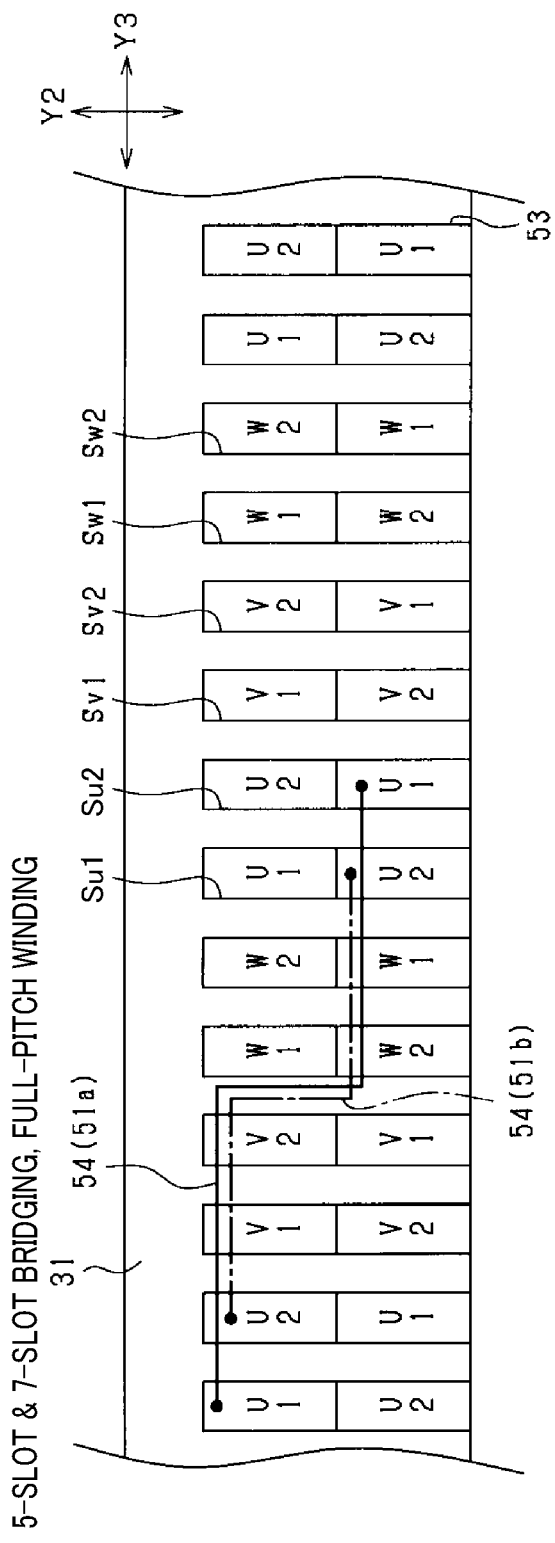
FIG. 12A is a schematic diagram illustrating the arrangement of a pair of first and second electrical conductor groups in the corresponding slots of the stator core.
Figure 12B:
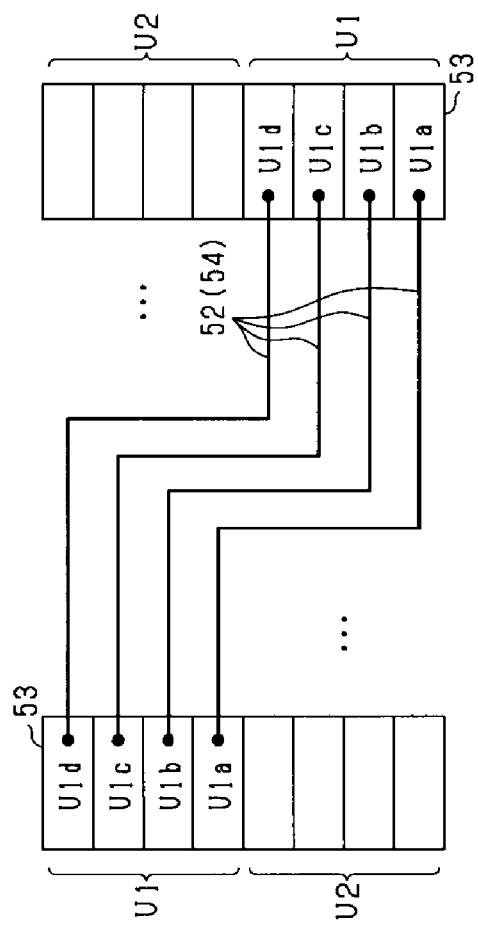
FIG. 12B is a schematic diagram illustrating the arrangement of the electrical conductor segments forming the first electrical conductor group shown in FIG. 12A in the corresponding slots of the stator core.

Moreover, as shown in FIGS. 12A and 12B, the turn portion 54 connects the pair of straight portions 53 located at different radial positions. Therefore, as shown in FIG. 2, the turn portion 54 has a bent part that menders (or is bent) in a substantially "S" shape when viewed along the axial direction. In addition, as shown in FIGS. 4A-4B and 7, each of the electrical conductor groups 51 is bent so that an axially-inner side surface of the turn portion 54 of the electrical conductor group 51, which is connected with the circumferentially-inner side surfaces of the straight portions 53 of the electrical conductor group 51, faces an axial end face of the stator core 31.

More specifically, in each of the electrical conductor groups 51 (i.e., the first and second electrical conductor groups 51a and 51b), the turn portion 54 has a first circumferential end connected with that one of the pair of straight portions 53 which is located radially inner side and a second circumferential end connected with that one of the pair of straight portions 53 which is located radially outer side. The turn portion 54 extends along the circumferential direction from the first circumferential end to the vicinity of a central part thereof. Moreover, as shown in FIGS. 2 and 7, the turn portion 54 has a first bend 55 that is bent from the radially inner side to the radially outer side with respect to the circumferential direction in the vicinity of the central part of the turn portion 54. The first bend 55 is bent to the extent that the turn portion 54 becomes parallel to the radial direction, i.e., to the extent that all the electrical conductor segments 52 forming the turn portion 54 become aligned with each other in the circumferential direction.

Figure 8:
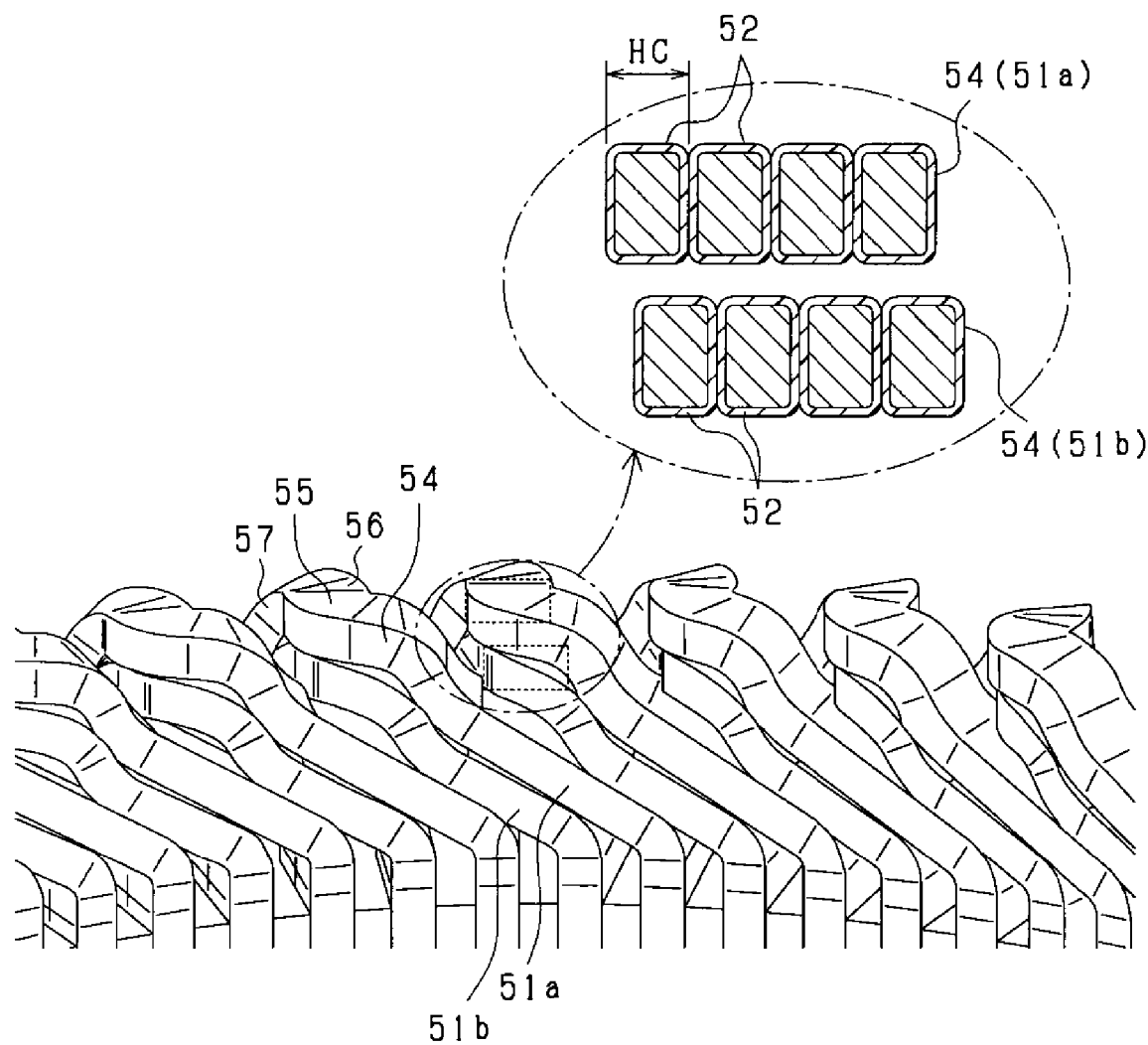
FIG. 8 is a schematic diagram illustrating the arrangement of electrical conductor segments at the turn portions of the electrical conductor groups.

Consequently, as shown in FIGS. 2 and 7-8, in the vicinity of the central part of the turn portion 54, there is formed a radially-extending part 56 that extends along the radial direction. In addition, as shown in FIG. 7, the radially-extending part 56 corresponds to an apex part of the turn portion 54 which is located axially furthest from the stator core 31 in the turn portion 54. That is, in the range from the first circumferential end to the radially-extending part 56, the turn portion 54 extends obliquely with respect to the axial direction and away from the stator core 31.

Moreover, as shown in FIG. 2, the radially-extending part 56 is connected with a second bend 57 of the turn portion 54 which is bent from the radially direction toward the circumferential direction. More specifically, the second bend 57 is bent at an acute angle in the shape of a hairpin curve such that part of the second bent 57 protrudes radially outward of the slots 35 of the stator core 31. From the second bend 57, the turn portion 54 extends along the circumferential direction to the second circumferential end thereof. In addition, as shown in FIG. 7, in the range from the radially-extending part 56 to the second circumferential end thereof, the turn portion 54 extends obliquely with respect to the axial direction and toward the stator core 31.

In the present embodiment, the radius of curvature (or rounding radius R) of the second bend 57 is set to be smaller than the radius of curvature of the first bend 55. Hence, in the turn portion 54, a bend having a smaller radius of curvature (i.e., the second bend 57) is located more radially outward than a bend having a larger radius of curvature (i.e., the first bend 55).

Moreover, as shown in FIG. 2, the protruding amount of the second bend 57 (i.e., the amount by which the second bend 57 protrudes radially outward of the slots 35 of the stator core 31) is set to be within the range of the back yoke 33 of the stator core 33. That is, the protruding amount is set such that the entire second bend 57 is located radially inside the radially outer periphery of the stator core 31.

On the other hand, as shown in FIG. 2, the first bend 55 does not protrude radially inward of the slots 35 of the stator core 31. That is, the amount by which the turn portion 54 protrudes radially outward of the slots 35 of the stator core 31 is set to be larger than the amount by which the turn portion 54 protrudes radially inward of the slots 35. In other words, the stator coil 32 bulges only radially outward, not radially inward of the slots 35 of the stator core 31.

As described above, in the present embodiment, the first bend 55, the radially-extending part 56 and the second bend 57 together constitute the substantially S-shaped bent part of the turn portion 54.

Moreover, in the present embodiment, the rotor 40 is configured to rotate in a predetermined rotational direction indicated by a blanked arrow in FIG. 2 (i.e., the counterclockwise direction in FIG. 2). In each of the electrical conductor groups 51 (i.e., the first and second electrical conductor groups 51a and 51b), the turn portion 54 extends radially outward as it extends in the rotational direction of the rotor 40. That is, of the pair of circumferential ends of the turn portion 54, the second circumferential end on the radially outer side is located forward (downstream) in the rotational direction of the rotor 40 from the first circumferential end on the radially inner side.

As shown in FIGS. 4 and 7, for each pair of the first and second electrical conductor groups 51a and 51b, the turn portions 54 of the first and second electrical conductor groups 51a and 51b are arranged to overlap each other in the axial direction. Moreover, the turn portion 54 of the second electrical conductor group 51b is located on the axially inner side (or the stator core 31 side) of the turn portion 54 of the first electrical conductor group 51a. Furthermore, the turn portions 54 of the first and second electrical conductor groups 51a and 51b are arranged so that an axially-inner side surface of the turn portion 54 of the first electrical conductor group 51a faces and is axially spaced at a substantially constant interval from an axially-outer side surface of the turn portion 54 of the second electrical conductor group 51b. That is, the turn portions 54 of the first and second electrical conductor groups 51a and 51b are arranged to extend parallel to each other.

More specifically, as shown in FIGS. 4A and 7, the oblique angles α of the turn portion 54 to the straight portions 53 in the first electrical conductor group 51a are substantially equal to the oblique angles α of the turn portion 54 to the straight portions 53 in the second electrical conductor group 51b. Moreover, the first bend 55, the radially-extending part 56 and the second bend 57 in the turn portion 54 of the first electrical conductor group 51a are located respectively at substantially the same circumferential positions as the first bend 55, the radially-extending part 56 and the second bend 57 in the turn portion 54 of the second electrical conductor group 51b. Furthermore, the radius of curvature of the first bend 55, the length of the radially-extending part 56 and the radius of curvature of the second bend 57 in the turn portion 54 of the first electrical conductor group 51a are set to be respectively substantially equal to the radius of curvature of the first bend 55, the length of the radially-extending part 56 and the radius of curvature of the second bend 57 in the turn portion 54 of the second electrical conductor group 51b. That is, the bent part of the turn portion 54 of the first electrical conductor group 51a and the bent part of the turn portion 54 of the second electrical conductor group 51b have the same substantially "S" shape.

With the above configuration, as shown in FIG. 8, at the turn portions 54 of each pair of the first and second electrical conductor groups 51a and 51b, the electrical conductor segments 52 constituting the first electrical conductor group 51a are arranged parallel to the electrical conductor segments 52 constituting the second electrical conductor group 51b. Moreover, the axially-inner side surfaces (i.e., the lower side surfaces in FIG. 8) of the electrical conductor segments 52 constituting the first electrical conductor group 51a are respectively axially opposed to and spaced at a substantially constant interval from the axially-outer side surfaces (i.e., the upper side surfaces in FIG. 8) of the electrical conductor segments 52 constituting the second electrical conductor group 51b.

In addition, the axially-inner side surfaces of the electrical conductor segments 52 constituting the first electrical conductor group 51a may alternatively be arranged in surface contact with the axially-outer side surfaces of the electrical conductor segments 52 constituting the second electrical conductor group 51b. That is, the axially-inner side surfaces of the electrical conductor segments 52 constituting the first electrical conductor group 51a may not be spaced from the axially-outer side surfaces of the electrical conductor segments 52 constituting the second electrical conductor group 51b.

Moreover, as shown in FIG. 2, the substantially S-shaped bent parts of the turn portions 54 of the electrical conductor groups 51 are arranged in alignment with each other in the circumferential direction. In the present embodiment, the circumferential pitch between the bent parts of the turn portions 54 of the electrical conductor groups 51 is set to be greater than or equal to the circumferential pitch between the slots 35 of the stator core 31 and less than or equal to twice the circumferential pitch between the slots 35.

More specifically, as shown in FIGS. 2 and 7, the radially-extending parts 56 of the turn portions 54 of the first electrical conductor groups 51a are arranged in alignment with each other in the circumferential direction. The circumferential pitch between the radially-extending parts 56 of the turn portions 54 of the first electrical conductor group 51a is set to be greater than or equal to the circumferential pitch between the slots 35 and less than or equal to twice the circumferential pitch between the slots 35. Similarly, the radially-extending parts 56 of the turn portions 54 of the second electrical conductor groups 51b are also arranged in alignment with each other in the circumferential direction. The circumferential pitch between the radially-extending parts 56 of the turn portions 54 of the second electrical conductor group 51b is also set to be greater than or equal to the circumferential pitch between the slots 35 and less than or equal to twice the circumferential pitch between the slots 35.

Moreover, between each circumferentially-adjacent pair of the radially-extending parts 56 of the turn portions 54 of the electrical conductor groups 51, there is provided a predetermined clearance C1. In the present embodiment, the stator 30 is configured to satisfy the following relationship:

$$Rc \times 2 \times \pi / S \leq N \times Hc \leq Rc \times 2 \times \pi / (S/2)$$

where Rc is the distance from a central axis of the stator core 31 (or the central axis O of the rotating shaft 11) to the radial center of each of the slots 35, S is the number of the slots 35 formed in the stator core 31, N is the number of the electrical conductor segments 52 included in each of the electrical conductor groups 51, and Hc is the radial thickness of each of the electrical conductor segments 52 in the corresponding slots 35 of the stator core 31.

In addition, the distance Rc is shown in FIGS. 2 and 3. As can be seen from FIG. 2, the distance Rc can be regarded as the distance from the central axis of the stator core 31 to the radial center position of the radially-extending parts 56 of the turn portions 54 of the electrical conductor groups 51. Moreover, as can be seen from FIG. 3, the distance Rc can also be regarded as the distance from the central axis of the stator core 31 to the boundary between the two electrical conductor groups 51 in each of the slots 35. The radial thickness Hc of each of the electrical conductor segments 52 is shown in FIG. 3. Furthermore, as can be seen from FIG. 8, N×Hc represents the circumferential dimension of each of the radially-extending parts 56 (or the apex parts) of the turn portions 54 of the electrical conductor groups 51.

Referring again to FIGS. 2 and 7, the first bends 55 of the turn portions 54 of the first electrical conductor group 51a are arranged in alignment with each other in the circumferential direction. The circumferential pitch between the first bends 55 of the turn portions 54 of the first electrical conductor group 51a is set to be greater than or equal to the circumferential pitch between the slots 35 and less than or equal to twice the circumferential pitch between the slots 35. Similarly, the first bends 55 of the turn portions 54 of the second electrical conductor group 51b are also arranged in alignment with each other in the circumferential direction. The circumferential pitch between the first bends 55 of the turn portions 54 of the second electrical conductor group 51b is also set to be greater than or equal to the circumferential pitch between the slots 35 and less than or equal to twice the circumferential pitch between the slots 35.

Moreover, the second bends 57 of the turn portions 54 of the first electrical conductor group 51a are arranged in alignment with each other in the circumferential direction. The circumferential pitch between the second bends 57 of the turn portions 54 of the first electrical conductor group 51a is set to be greater than or equal to the circumferential pitch between the slots 35 and less than or equal to twice the circumferential pitch between the slots 35. Similarly, the second bends 57 of the turn portions 54 of the second electrical conductor group 51b are also arranged in alignment with each other in the circumferential direction. The circumferential pitch between the second bends 57 of the turn portions 54 of the second electrical conductor group 51b is also set to be greater than or equal to the circumferential pitch between the slots 35 and less than or equal to twice the circumferential pitch between the slots 35.

In the present embodiment, as shown in FIG. 12B, for each of the electrical conductor groups 51, the electrical conductor segments 52 constituting the electrical conductor group 51 are arranged, at the turn portion 54 of the electrical conductor group 51, parallel to each other keeping the arrangement sequence of the electrical conductor segments 52 at the pair of straight portions 53 of the electrical conductor group 51 in the corresponding slots 35 of the stator core 31.

Figure 9:
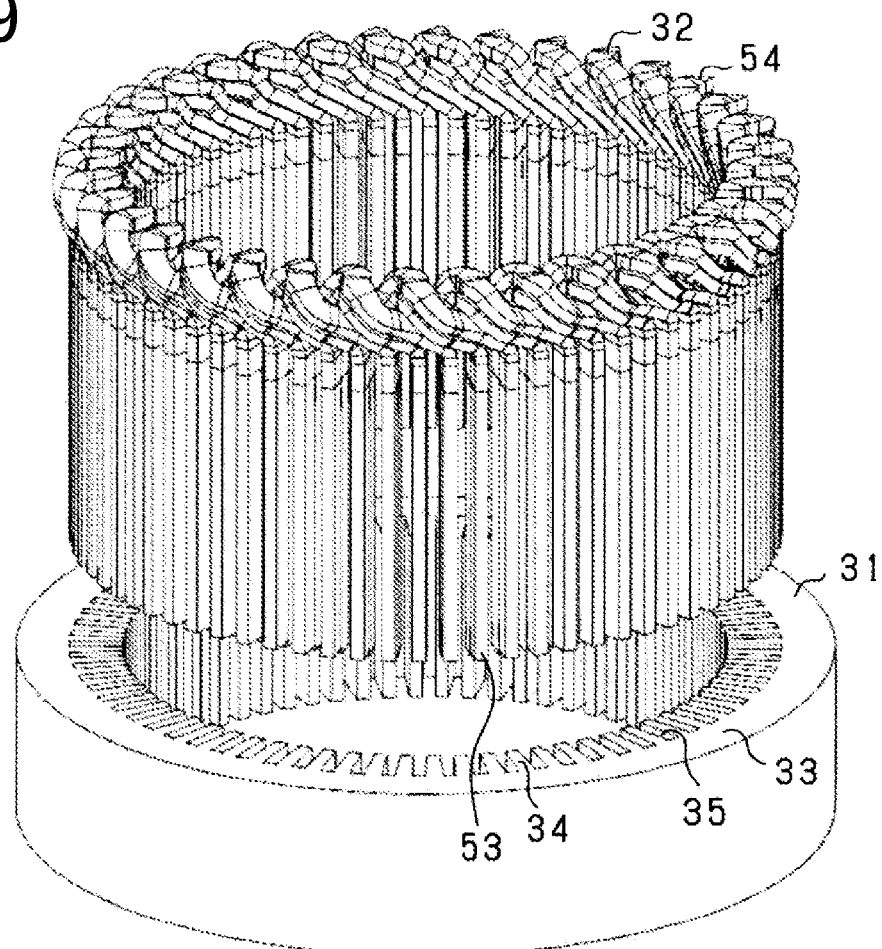
FIG. 9 is a perspective view showing the electrical conductor groups, which are assembled together, and the stator core before insertion of the electrical conductor groups into slots of the stator core.
Figure 10:
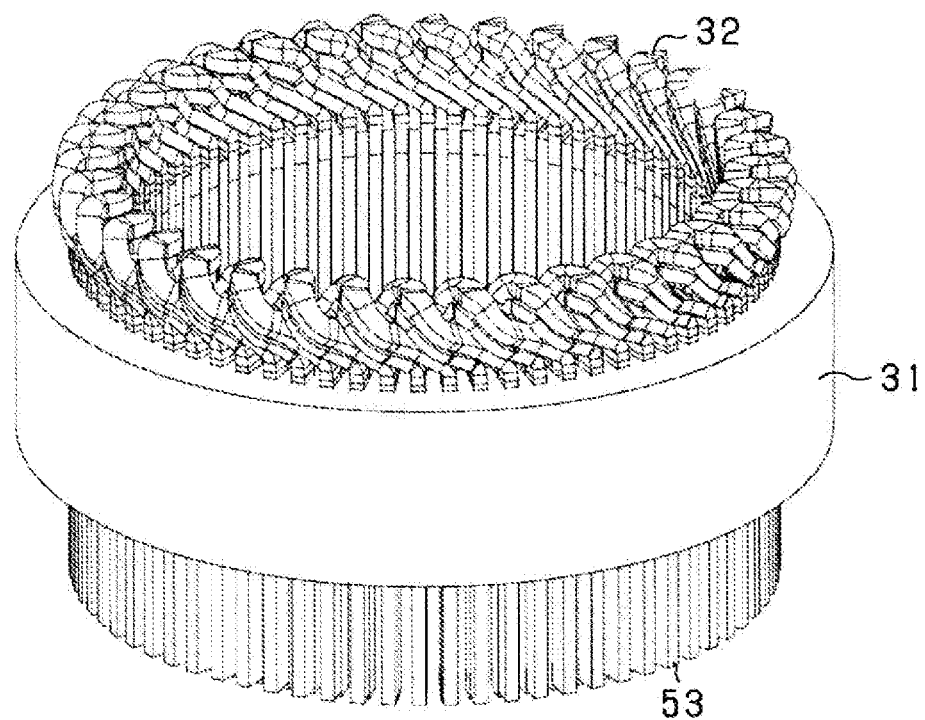
FIG. 10 is a perspective view showing the electrical conductor groups and the stator core after insertion of the electrical conductor groups into the slots of the stator core.

As shown in FIG. 9, the straight portions 53 of each axially-overlapped pair of the first and second electrical conductor groups 51a and 51b are inserted, from the first axial side (i.e., the upper side in FIG. 9) of the stator core 41, into the corresponding slots 35 of the stator core 31. Then, distal end parts of the straight portions 53, which protrude outside the corresponding slots 35 on the second axial side (i.e., the lower side in FIG. 10) of the stator core 31, are twisted and bent along the circumferential direction at a predetermined pitch, thereby forming connection portions 58.

As shown in FIGS. 11 and 13, each of the connection portions 58 includes a first terminal portion 58a bent circumferentially outward of a corresponding pair of the straight portions 53 and a second terminal portion 58b bent circumferentially inward of a corresponding pair of the straight portions 53.

Figure 11A:
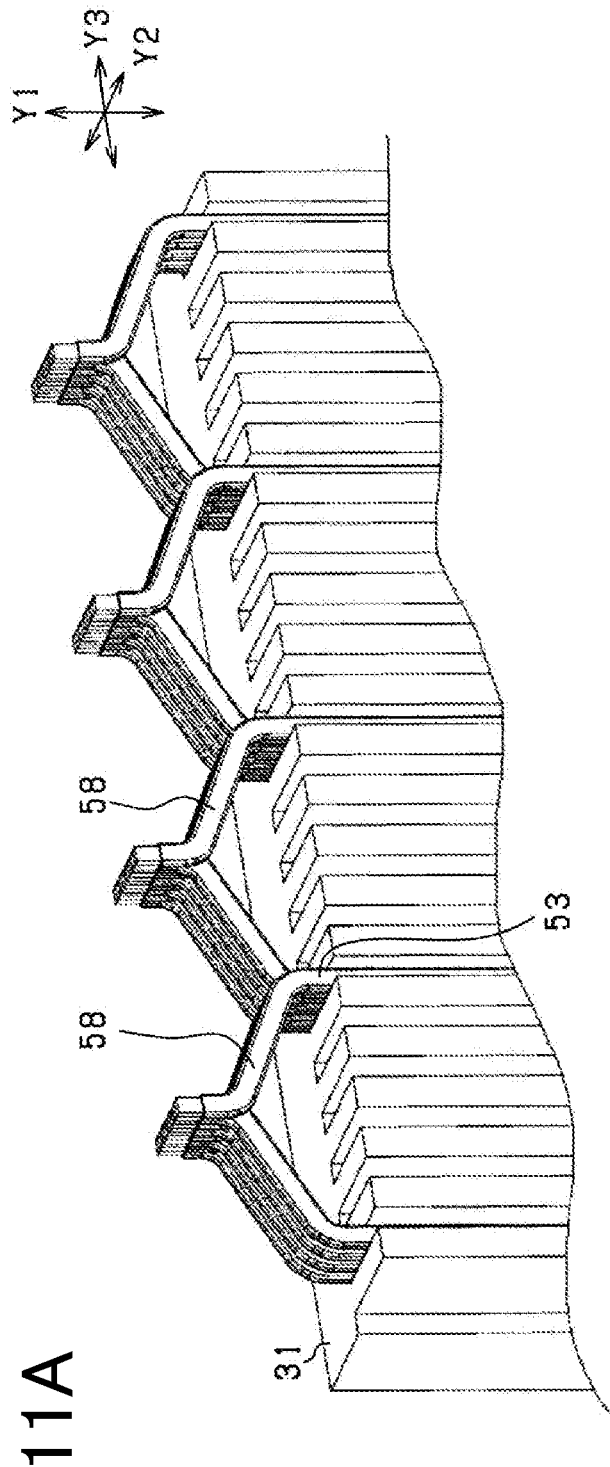
FIG. 11 A is a perspective view of part of the stator developed in a circumferential direction.
FIG. 11B is a plan view of part of the stator developed in the circumferential direction.
Figure 11B:
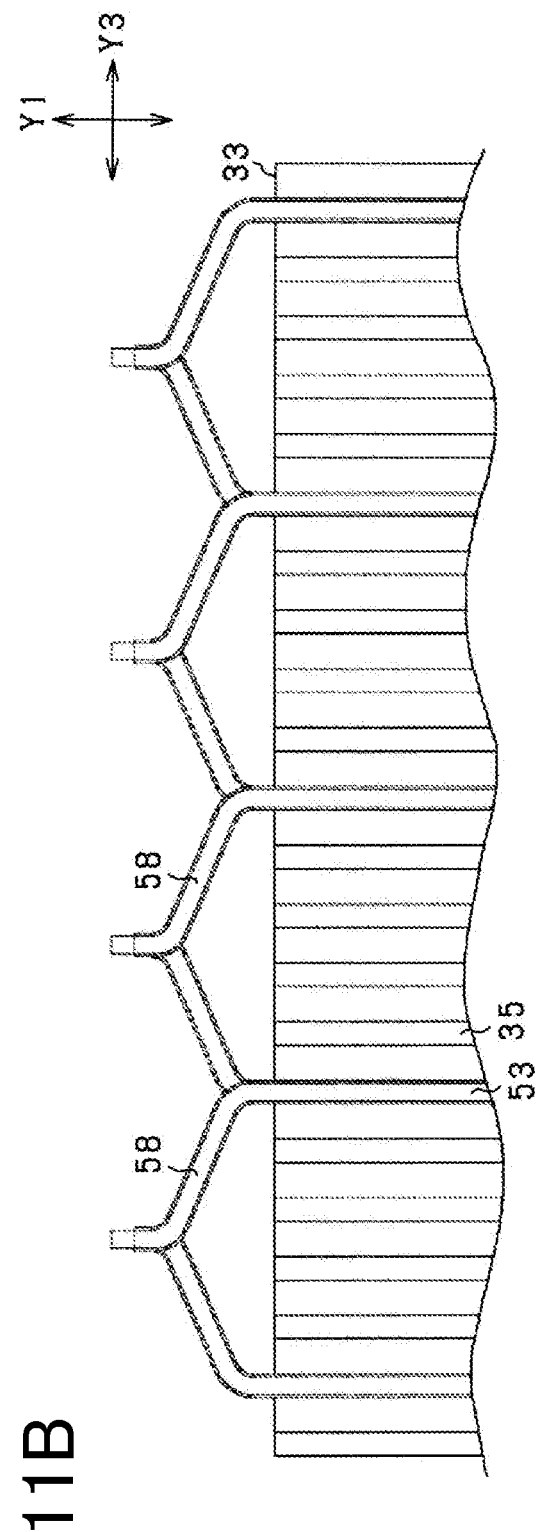

In addition, FIG. 11A is a perspective view of part of the stator 30 developed in the circumferential direction. FIG. 11B is a plan view of part of the stator 30 developed in the circumferential direction. It should be noted that for the sake of simplicity, there are shown only some of the connection portions 58 in FIGS. 11A and 11B and that actually all the slots 35 of the stator core 31 have the corresponding straight portions 53 of the electrical conductor groups 51 received therein and the corresponding connection portions 58 protruding therefrom.

The bending directions of the terminal portions 58a and 58b are varied, based on a predetermined connection pattern of the stator coil 32, for the electrical conductor segments 52 constituting the electrical conductor groups 51. In addition, the manner of varying the bending directions of the terminal portions 58a and 58b for the electrical conductor segments 52 is illustrated in FIGS. 11A and 11B.

Each corresponding pair of the terminal portions 58a and 58b of the electrical conductor groups 51 are joined by, for example, TIG welding, laser welding, ultrasonic welding or the like. Consequently, the connection portions 58 are engaged with and fixed to the stator core 31 in the axial direction; thus the electrical conductor groups 51 are fixed, by the connection portions 58 and the turn portions 54, to the stator core 31. As a result, the straight portions 53 of the electrical conductor groups 51 are restricted from axially moving relative to the stator core 31 and thus reliably held in the corresponding slots 35 of the stator core 31.

Moreover, by the connection portions 58, the electrical conductor groups 51 are electrically connected in the predetermined connection pattern, forming the U-phase, V-phase and W-phase windings of the stator coil 32.

Next, the connection pattern of the stator coil 32 will be described in detail with reference to FIGS. 12A-12B and 13.

FIG. 12A illustrates the arrangement of a pair of first and second electrical conductor groups 51a and 51b in the corresponding slots 35 of the stator core 31. FIG. 12B illustrates the arrangement of the electrical conductor segments 52 constituting the first electrical conductor group 51a shown in FIG. 12A in the corresponding slots 35 of the stator core 31. FIG. 13 illustrates the connection pattern of the U-phase winding of the stator coil 32. In addition, in FIGS. 12A and 13, the first electrical conductor group 51a is shown with solid lines whereas the second electrical conductor group 51b is shown with dashed lines.

In the present embodiment, as shown in FIGS. 12A-12B and 13, each phase winding of the stator coil 32 is configured as a distributed winding.

Moreover, as shown in FIGS. 12A-12B, for each of the electrical conductor groups 51 (i.e., the first and second electrical conductor groups 51a and 51b), one of the pair of straight portions 53 of the electrical conductor group 51 is received in a radially outer part of one corresponding slot 35 while the other of the pair of straight portions 53 is received in a radially inner part of another corresponding slot 35. Furthermore, for each pair of the first and second electrical conductor groups 51a and 51b, the turn portion 54 of the first electrical conductor group 51a is formed at a 7-slot pitch while the turn portion 54 of the second electrical conductor group 51b is formed at a 5-slot pitch.

As shown in FIG. 13, in each of the electrical conductor groups 51, the pair of straight portions 53 located at different radial positions are connected by the turn portion 54 on the first axial side (i.e., the upper side in FIG. 13) of the stator core 31. On the other hand, on the second axial side (i.e., the lower side in FIG. 13) of the stator core 31, each corresponding pair of the straight portions 53, which belong to different ones of the electrical conductor groups 51 and are located at the same radial position, are connected by one of the connection portions 58.

Furthermore, as shown in FIG. 13, each phase winding of the stator coil 32 is wound on the stator core 31 in a distributed winding manner, more particularly in a wave-lap winding manner. Moreover, each phase winding of the stator coil 32 is configured as a full-pitch winding whose pitch is equal to the magnetic pole pitch.

As described previously, in the present embodiment, as shown in FIG. 14, the U-phase, V-phase and W-phase windings of the stator coil 32 are star-connected to define the neutral point therebetween. Moreover, the first and second electrical conductor groups 51a and 51b forming a same one of the U-phase, V-phase and W-phase windings of the stator coil 32 are connected in series with each other. Furthermore, the first electrical conductor groups 51a are connected closer to the neutral point than the second electrical conductor groups 52 are.

According to the present embodiment, it is possible to achieve the following advantageous effects.

In the present embodiment, the electric motor 10 includes the stator 30 (or armature). The stator 30 includes the stator core 31 (or annular armature core) and the three-phase stator coil 32 (or armature coil) wound on the stator core 31. The stator core 31 has the plurality of slots 35 arranged in the circumferential direction thereof. The stator coil 32 is formed of the plurality of electrical conductor groups 51 connected with one another. Each of the electrical conductor groups 51 is constituted of a bundle of a plurality (e.g., four in the present embodiment) of electrical conductor segments 52. Each of the plurality of electrical conductor groups 51 is substantially U-shaped to have the pair of straight portions 53 (or leg portions) and the turn portion 54 (or connecting portion). The pair of straight portions 53 are respectively received in a corresponding pair of the slots 35 of the stator core 31 so as to be located at different radial positions in the corresponding slots 35. The turn portion 54 extends on the first axial side of the stator core 31 to connect the pair of straight portions 53. The turn portion 54 has the substantially S-shaped bent part that is bent radially with respect to the circumferential direction. The plurality of electrical conductor groups 51 are paired such that each pair of the electrical conductor groups 51 consists of a first electrical conductor group 51a and a second electrical conductor group 51b that both belong to a same phase of the stator coil 32. The circumferential pitch between the pair of straight portions 53 of the first electrical conductor group 51a is greater than the circumferential pitch between the pair of straight portions 53 of the second electrical conductor group 51b. In each pair of the electrical conductor groups 51, the turn portions 54 of the first and second electrical conductor groups 51a and 51b are arranged to axially overlap each other.

With the above arrangement, it becomes possible to provide a greater clearance between each circumferentially-adjacent pair of the turn portions 54 of the electrical conductor groups 51 than in the case of arranging the turn portions 54 of the first and second electrical conductor groups 51a and 51b not to axially overlap each other. Consequently, it becomes easier to change the design specifications of the electric motor 10, such as reducing the outer diameter of the stator 30, increasing the number of the slots 35 formed in the stator core 31, increasing the thickness of the electrical conductor segments 52 or increasing the number of the electrical conductor segments 52 included in each of the electrical conductor groups 51.

Moreover, with the above arrangement, it becomes possible to reduce the clearance between each axially-adjacent pair of the turn portions 54 of the electrical conductor groups 51 and thereby reduce the size of a coil end of the stator coil 32 than in the case of arranging the turn portions 54 of the first and second electrical conductor groups 51a and 51b not to axially overlap each other. In addition, the coil end is constituted of all the turn portions 54 of the electrical conductor groups 51.

Furthermore, to arrange the turn portions 54 of the first and second electrical conductor groups 51a and 51b to axially overlap each other, the electrical conductor groups 51 are bent in the same manner at the respective turn portions 54. Consequently, it becomes possible to prevent interference from occurring between each adjacent pair of the turn portions 54 of the electrical conductor groups 51.

In addition, since the turn portions 54 of the first and second electrical conductor groups 51a and 51b, which are arranged to axially overlap each other, belong to a same phase of the stator coil 32, it becomes possible to suppress electric discharge from occurring even when the first and second electrical conductor groups 51a and 51b are accidentally brought into contact with each other.

In the present embodiment, for each of the electrical conductor groups 51, the electrical conductor segments 52 constituting the electrical conductor group 51 are arranged, at the pair of straight portions 53 of the electrical conductor group 51, in the predetermined arrangement sequence in the radial direction so as to be radially aligned with each other in the corresponding slots 35 of the stator core 31. Moreover, at the turn portion 54 of the electrical conductor group 51, the electrical conductor segments 52 constituting the electrical conductor group 51 are arranged parallel to each other keeping the arrangement sequence of the electrical conductor segments 52 at the pair of straight portions 53 of the electrical conductor group 51 in the corresponding slots 35.

With the above arrangement, the electrical conductor segments 52 may be bent in the same manner, thereby facilitating the manufacture of the stator 30. Moreover, the electrical conductor segments 52 may be arranged along the circumferential direction at the turn portion 54, thereby reducing the axial width of the turn portion 54.

In the present embodiment, the substantially S-shaped bent parts of the turn portions 54 of the first electrical conductor groups 51a are arranged in alignment with each other in the circumferential direction. The circumferential pitch between the bent parts of the turn portions 54 of the first electrical conductor groups 51a is greater than or equal to the circumferential pitch between the slots 35 of the stator core 31 and less than or equal to twice the circumferential pitch between the slots 35. The substantially S-shaped bent parts of the turn portions 54 of the second electrical conductor groups 51b are also arranged in alignment with each other in the circumferential direction. The circumferential pitch between the bent parts of the turn portions 54 of the second electrical conductor groups 51b is also greater than or equal to the circumferential pitch between the slots 35 of the stator core 31 and less than or equal to twice the circumferential pitch between the slots 35.

With the above arrangement, it becomes possible to reduce the axial width of the coil end which is constituted of all the turn portions 54 of the electrical conductor groups 51.

In the present embodiment, for each of the electrical conductor groups 51, one of the pair of straight portions 53 of the electrical conductor group 51 is received in the radially outer part of one corresponding slot 35 of the stator core 31 and the other of the pair of straight portions 53 is received in the radially inner part of another corresponding slot 35 of the stator core 31. In the bent part of the turn portion 54 of the electrical conductor group 51, there is formed the radially-extending part 56 which extends along the radial direction and in which the electrical conductor segments 52 constituting the electrical conductor group 51 are arranged in alignment with each other in the circumferential direction. Moreover, the radially-extending parts 56 of the turn portions 54 of the first electrical conductor groups are arranged in alignment with each other in the circumferential direction; and the radially-extending parts 56 of the turn portions 54 of the second electrical conductor groups are also arranged in alignment with each other in the circumferential direction. The stator 30 is configured to satisfy the relationship of $Rc \times 2 \times \pi / S \leq N \times Hc \leq Rc \times 2 \times \pi / (S/2)$.

With the above configuration, it becomes possible to more effectively reduce the axial width of the coil end which is constituted of all the turn portions 54 of the electrical conductor groups 51.

In the present embodiment, between each circumferentially-adjacent pair of the bent parts of the turn portions 54 of the electrical conductor groups 51, there is provided the predetermined clearance C1.

The bent parts of the turn portions 54 are generally formed by bending the electrical conductor segments 52. Therefore, at the bent parts of the turn portions 54, it is easier for large strain to be induced and for the insulating coats 52b of the electrical conductor segments 52 to be damaged than at the other parts of the turn portions 54. However, with the clearance C1 provided between each circumferentially-adjacent pair of the bent parts of the turn portions 54 of the electrical conductor groups 51, more specifically between each circumferentially-adjacent pair of the radially-extending parts 56 of the bent parts, it is still possible to ensure electrical insulation between the U-phase, V-phase and W-phase windings of the stator coil 32.

In the present embodiment, for each of the electrical conductor groups 51, one of the pair of straight portions 53 of the electrical conductor group 51 is received in the radially outer part of one corresponding slot 35 of the stator core 31 and the other of the pair of straight portions 53 is received in the radially inner part of another corresponding slot 35 of the stator core 31. Moreover, each of the electrical conductor groups 51 is configured to satisfy the relationship of $Wc \times 2 < Hc \times N$. Furthermore, each of the electrical conductor groups 51 is bent so that the axially-inner side surface of the turn portion 54 of the electrical conductor group 51, which is connected with the circumferentially-inner side surfaces of the straight portions 53 of the electrical conductor group 51, faces the axial end face of the stator core 31.

With the above configuration, it becomes possible to more effectively reduce the axial width of the turn portions 54 of the electrical conductor groups 51.

In the present embodiment, the stator coil 32 is a three-phase coil having the U-phase, V-phase and W-phase windings star-connected to define the neutral point therebetween. The first and second electrical conductor groups 51a and 51b forming a same one of the U-phase, V-phase and W-phase windings of the stator coil 32 are connected in series with each other. Moreover, the first electrical conductor groups 51a are connected closer to the neutral point than the second electrical conductor groups 51b are (see FIG. 14).

With the above configuration, the second electrical conductor groups 51b are higher in electric potential than the first electrical conductor groups 51a. Moreover, as described above, in the present embodiment, in each pair of the electrical conductor groups 51, the second electrical conductor group 51b is located axially inside and covered by the first electrical conductor group 51a. Consequently, it becomes possible to secure a sufficient distance from the second electrical conductor group 51b to other electrical conductor groups 51 belonging to a different phase of the stator coil 32 from the second electrical conductor group 51b, thereby improving the insulation properties of the stator coil 32.

In the present embodiment, at the turn portions 54 of each pair of the electrical conductor groups 51, the axially-inner side surface of the first electrical conductor group 51a and the axially-outer side surface of the second electrical conductor group 51b are axially opposed to and spaced at a substantially constant interval from each other. That is, the turn portions 54 of the first and second electrical conductor groups 51a and 51b are arranged to extend parallel to each other. Consequently, it becomes possible to prevent the turn portions 54 of the first and second electrical conductor groups 51a and 51b from making contact with each other, thereby preventing the insulating coats 52b of the electrical conductor segments 52 constituting the first and second electrical conductor groups 51a and 51b from being damaged due to contact between the turn portions 54. As an alternative, at the turn portions 54 of each pair of the electrical conductor groups 51, the axially-inner side surface of the first electrical conductor group 51a and the axially-outer side surface of the second electrical conductor group 51b may be arranged in surface contact with each other. In this case, it is possible to secure a larger contact area between the axially-inner side surface of the first electrical conductor group 51a and the axially-outer side surface of the second electrical conductor group 51b than in the case of arranging them in point contact or line contact with each other; consequently, it is possible to suppress damage to the insulating coats 52b of the electrical conductor segments 52 constituting the first and second electrical conductor groups 51a and 51b due to contact between the turn portions 54.

In the present embodiment, each of the electrical conductor segments 52 includes the main body 52a formed of an electrically-conductive material and the insulating coat 52b covering the surface of the main body 52a. The insulating coat 52b is formed of an electrically-insulative material with voids formed therein.

With the above configuration, when the insulating coats 52b of the electrical conductor segments 52 are subjected to, for example, external force or vibration, the voids formed in the insulating coats 52b may collapse, thereby considerably deteriorating the insulation properties of the insulating coats 52b. However, as described above, in the present embodiment, the turn portions 54 of each pair of the electrical conductor groups 51 are arranged to axially overlap each other; between each circumferentially-adjacent pair of the bent parts of the turn portions 54 of the electrical conductor groups 51, there is provided the predetermined clearance Cl. Consequently, though the insulating coat 52b is formed of the electrically-insulative material with voids formed therein, it is still possible to secure the insulation properties of the insulating coats 52b.

In the present embodiment, at the turn portions 54 of each pair of the electrical conductor groups 51, the electrical conductor segments 52 constituting the first electrical conductor group 51a are respectively axially opposed to and spaced at a substantially constant interval from the electrical conductor segments 52 constituting the second electrical conductor group 51b (see FIG. 8).

With the above arrangement, it is possible to prevent damage to the insulating coats 52b of the electrical conductor segments 52 while suppressing increase in the axial width of the coil end which is constituted of all the turn portions 54 of the electrical conductor groups 51.

In the present embodiment, in each of the electrical conductor groups 51, the bent part of the turn portion 54 is configured to include the first bend 55, the radially-extending part 56 and the second bend 57. The radius of curvature (or rounding radius R) of the second bend 57 is set to be smaller than the radius of curvature of the first bend 55. Moreover, the second bend 57 is located radially outside the first bend 55 (see FIG. 2).

With the above configuration, it becomes possible to arrange all the second bends 57 of the turn portions 54 of the electrical conductor groups 51, where the radius of curvature is relatively small and thus it is easier for the insulating coats 52b of the electrical conductor segments 52 constituting the electrical conductor groups 51 to be damaged during the bending of the electrical conductor groups 51, at a radially-outer part of the stator coil 32. Consequently, it becomes possible to secure a sufficient clearance between each circumferentially-adjacent pair of the second bends 57 of the turn portions 54 of the electrical conductor groups 51, thereby improving the insulation properties of the stator coil 32.

In the present embodiment, the turn portions 54 of the electrical conductor groups 51 are formed so that the amount by which the turn portions 54 protrude radially outward of the slots 35 of the stator core 31 is larger than the amount by which the turn portions 54 protrude radially inward of the slots 35. In other words, the stator coil 32 bulges only radially outward, not radially inward of the slots 35 of the stator core 31 (see FIG. 2).

With the above configuration, it becomes possible to prevent the stator coil 32 from making contact with the rotor 40. Moreover, it also becomes possible to secure a sufficient clearance between each circumferentially-adjacent pair of the bent parts of the turn portions 54 of the electrical conductor groups 51 while suppressing increase in the axial width of the coil end which is constituted of all the turn portions 54 of the electrical conductor groups 51.

In the present embodiment, the rotor 40 is configured to rotate in the predetermined rotational direction (i.e., the counterclockwise direction in FIG. 2). In each of the electrical conductor groups 51, the turn portion 54 extends radially outward as it extends in the rotational direction of the rotor 40. That is, of the pair of circumferential ends of the turn portion 54, the second circumferential end on the radially outer side is located forward in the rotational direction of the rotor 40 from the first circumferential end on the radially inner side.

With the above configuration, in the case of cooling the stator coil 32 by oil, it is easy for the oil flowing from the rotor 40 to pass through the gaps between the turn portions 54 of the electrical conductor groups 51, thereby effectively cooling the stator coil 32. Otherwise, in the case of cooling the stator coil 32 by air, it is easy for the air flowing from the rotor 40 to pass through the gaps between the turn portions 54 of the electrical conductor groups 51. Consequently, the air resistance can be lowered, thereby suppressing wind noise generated during rotation of the rotor 40.

While the above particular embodiment has been shown and described, it will be understood by those skilled in the art that various modifications, changes and improvements may be made without departing from the spirit of the present disclosure.

[First Modification]

In the above-described embodiment, each of the electrical conductor segments 52 includes the main body 52a formed of an electrically-conductive material and the insulating coat 52b covering the surface of the main body 52a. The insulating coat 52b is formed of an electrically-insulative material with voids formed therein (see FIG. 6).

Figure 15A:
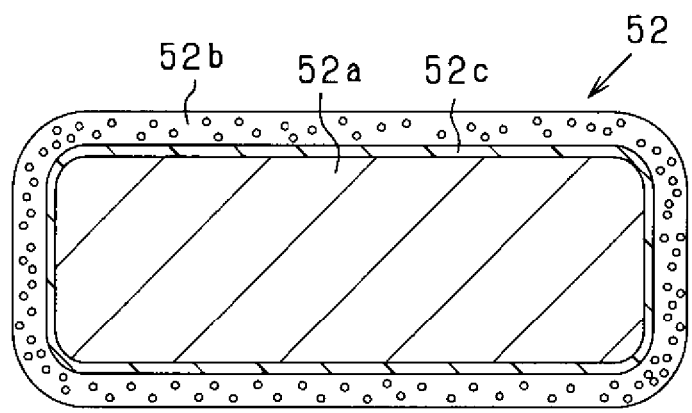
FIG. 15A is an enlarged cross-sectional view of an electrical conductor segment according to a first modification.

As an alternative, as shown in FIG. 15A, each of the electrical conductor segments 52 may further include an insulating coat 52c having no voids formed therein. Moreover, the insulating coat 52c without voids may be provided to cover the surface of the main body 52a and the insulating coat 52b with voids may be provided to cover the outer surface of the insulating coat 52c.

Figure 15B:
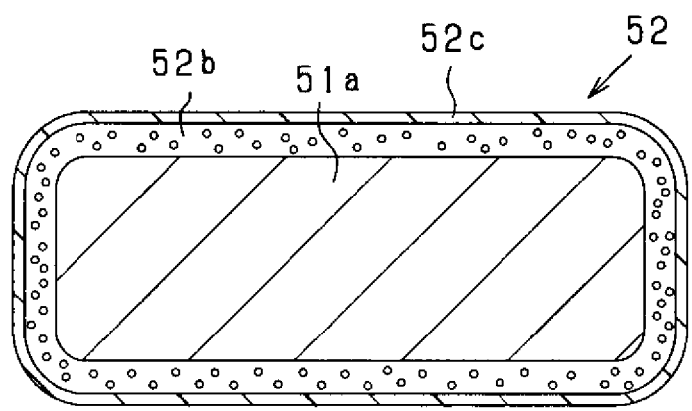
FIG. 15B is an enlarged cross-sectional view of another electrical conductor segment according to the first modification.

As another alternative, as shown in FIG. 15B, the insulating coat 52b with voids may be provided to cover the surface of the main body 52a and the insulating coat 52c without voids may be provided to cover the outer surface of the insulating coat 52b.

[Second Modification]

In the above-described embodiment, as shown in FIG. 8, in each pair of the first and second electrical conductor groups 51a and 51b, the electrical conductor segments 52 constituting the first electrical conductor group 51a are aligned in a row such that the axially-inner and axially-outer side surfaces of the turn portion 54 of the first electrical conductor group 51a are flat in shape; the electrical conductor segments 52 constituting the second electrical conductor group 51b are aligned in a row such that the axially-inner and axially-outer side surfaces of the turn portion 54 of the second electrical conductor group 51b are flat in shape; and the axially-inner side surface of the turn portion 54 of the first electrical conductor group 51a and the axially-outer side surface of the turn portion 54 of the second electrical conductor group 51b are axially opposed to and spaced at a substantially constant interval from each other.

Figure 16A:
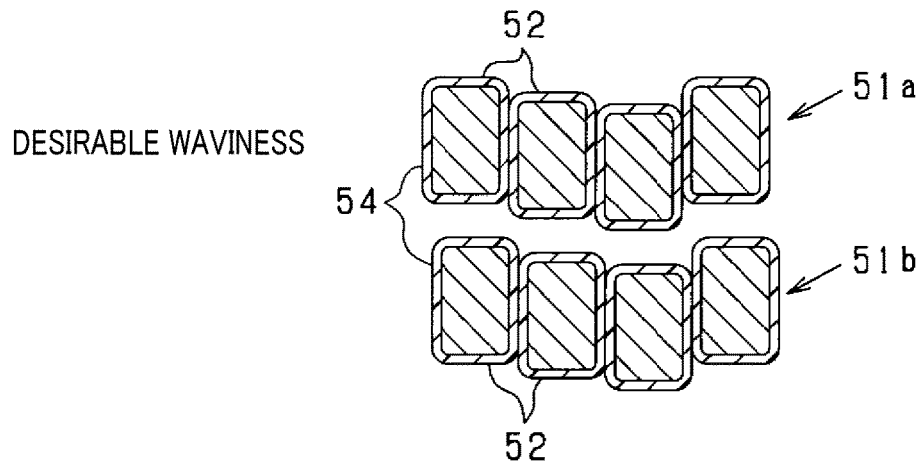
FIG. 16A is a schematic diagram illustrating a desirable arrangement of electrical conductor segments at the turn portions of the electrical conductor groups according to a second modification.
Figure 16B:
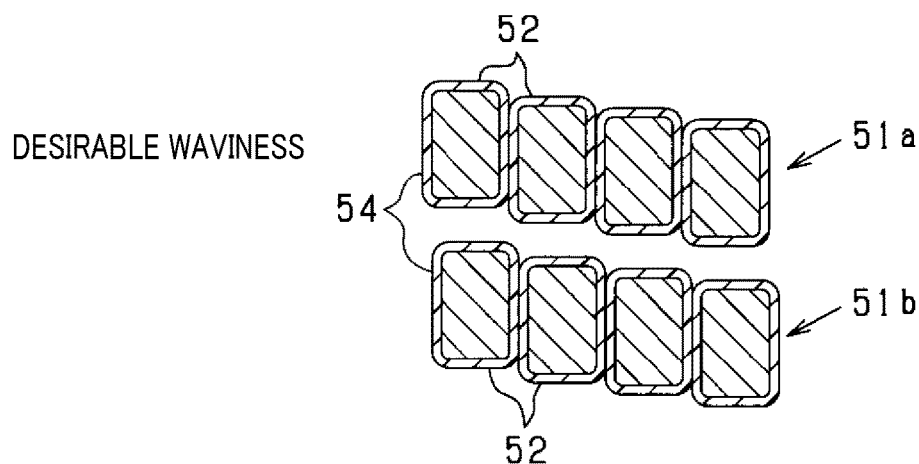
FIG. 16B is a schematic diagram illustrating another desirable arrangement of electrical conductor segments at the turn portions of the electrical conductor groups according to the second modification.
Figure 16C:
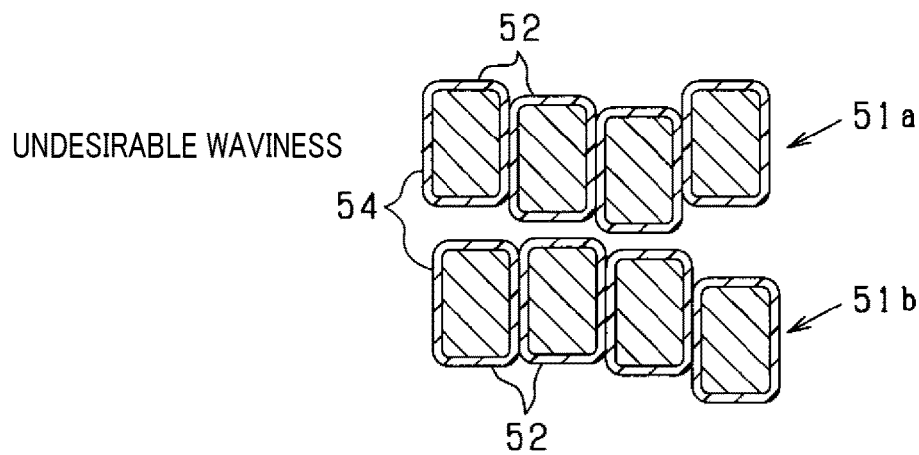
FIG. 16C is a schematic diagram illustrating an undesirable arrangement of electrical conductor segments at the turn portions of the electrical conductor groups according to the second modification.

Alternatively, as shown in FIGS. 16A-16C, in each pair of the first and second electrical conductor groups 51a and 51b, the electrical conductor segments 52 constituting the first electrical conductor group 51a may be aligned such that the axially-inner and axially-outer side surfaces of the turn portion 54 of the first electrical conductor group 51a are wavy in shape; and the electrical conductor segments 52 constituting the second electrical conductor group 51b may be aligned such that the axially-inner and axially-outer side surfaces of the turn portion 54 of the second electrical conductor group 51b are wavy in shape. Moreover, in this case, it is desirable that the axially-inner side surface of the turn portion 54 of the first electrical conductor group 51a and the axially-outer side surface of the turn portion 54 of the second electrical conductor group 51b are axially opposed to and spaced at a substantially constant interval from each other as shown in FIGS. 16A and 16B. In contrast, it is undesirable that the interval between the axially-inner side surface of the turn portion 54 of the first electrical conductor group 51a and the axially-outer side surface of the turn portion 54 of the second electrical conductor group 51b is uneven as shown in FIG. 16C.

[Third Modification]

In the above-described embodiment, as shown in FIGS. 12A-12B and 13, each phase winding of the stator coil 32 is configured as a full-pitch distributed winding. Moreover, for each pair of the first and second electrical conductor groups 51a and 51b, the turn portion 54 of the first electrical conductor group 51a is formed at a 7-slot pitch while the turn portion 54 of the second electrical conductor group 51b is formed at a 5-slot pitch.

However, each phase winding of the stator coil 32 may alternatively be wound in other manners. Moreover, the turn portions 54 of the electrical conductor groups 51 may alternatively be formed at pitches other than 7-slot and 5-slot pitches.

For example, as shown in FIGS. 17A and 17B, each phase winding of the stator coil 32 may alternatively be configured as a short-pitch distributed winding. Specifically, in this example, as shown in FIG. 17A, for each of the electrical conductor groups 51 (i.e., the first and second electrical conductor groups 51a and 51b), one of the pair of straight portions 53 of the electrical conductor group 51 is received in a radially outer part of one corresponding slot 35 while the other of the pair of straight portions 53 is received in a radially inner part of another corresponding slot 35. Moreover, for each pair of the first and second electrical conductor groups 51a and 51b, the turn portion 54 of the first electrical conductor group 51a is formed at a 6-slot pitch while the turn portion 54 of the second electrical conductor group 51b is formed at a 4-slot pitch. Furthermore, as shown in FIG. 17B, in each of the electrical conductor groups 51, the pair of straight portions 53 located at different radial positions are connected by the turn portion 54 on the first axial side (i.e., the upper side in FIG. 17B) of the stator core 31. On the other hand, on the second axial side (i.e., the lower side in FIG. 17B) of the stator core 31, each corresponding pair of the straight portions 53, which belong to different ones of the electrical conductor groups 51 and are located at the same radial position, are connected by one of the connection portions 58. In addition, as shown in FIG. 17B, each phase winding of the stator coil 32 is wound on the stator core 31 in a distributed winding manner, more particularly in a wave-lap winding manner.

As an alternative, as shown in FIGS. 18A and 18B, each phase winding of the stator coil 32 may be wound on the stator core 31 in a wave winding manner. Specifically, in the example shown in FIG. 18A, each phase winding of the stator coil 32 is configured as a wave-wound full-pitch winding. Moreover, for each pair of the first and second electrical conductor groups 51a and 51b, the turn portion 54 of the first electrical conductor group 51a is formed at a 7-slot pitch while the turn portion 54 of the second electrical conductor group 51b is formed at a 5-slot pitch. On the other hand, in the example shown in FIG. 18B, each phase winding of the stator coil 32 is configured as a wave-wound short-pitch winding. Moreover, for each pair of the first and second electrical conductor groups 51a and 51b, the turn portion 54 of the first electrical conductor group 51a is formed at a 6-slot pitch while the turn portion 54 of the second electrical conductor group 51b is formed at a 4-slot pitch.

Figure 19A:
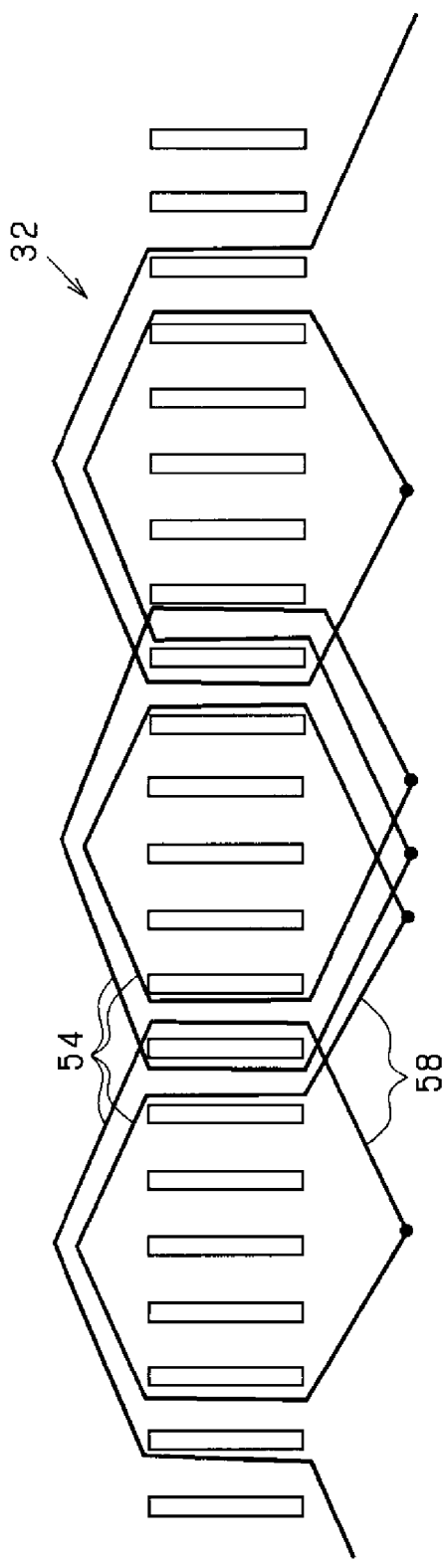
FIG. 19A is a schematic diagram illustrating an example where each phase winding of the stator coil is configured as a lap-wound full-pitch winding according to the third modification.
Figure 19B:
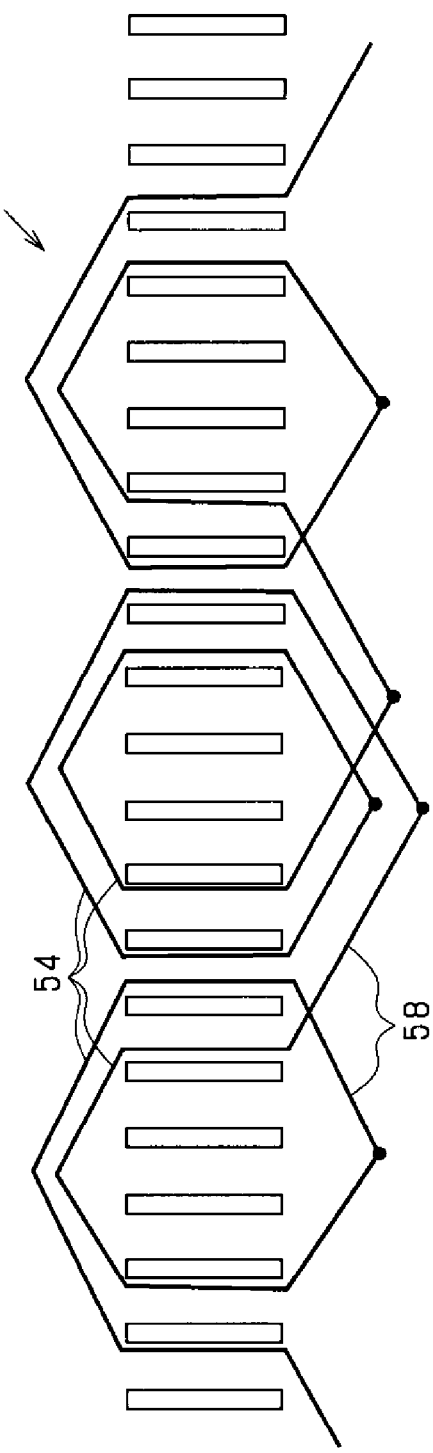
FIG. 19B is a schematic diagram illustrating an example where each phase winding of the stator coil is configured as a lap-wound short-pitch winding according to the third modification.

As another alternative, as shown in FIGS. 19A and 19B, each phase winding of the stator coil 32 may be wound on the stator core 31 in a lap winding manner. Specifically, in the example shown in FIG. 19A, each phase winding of the stator coil 32 is configured as a lap-wound full-pitch winding. Moreover, for each pair of the first and second electrical conductor groups 51a and 51b, the turn portion 54 of the first electrical conductor group 51a is formed at a 7-slot pitch while the turn portion 54 of the second electrical conductor group 51b is formed at a 5-slot pitch. On the other hand, in the example shown in FIG. 19B, each phase winding of the stator coil 32 is configured as a lap-wound short-pitch winding. Moreover, for each pair of the first and second electrical conductor groups 51a and 51b, the turn portion 54 of the first electrical conductor group 51a is formed at a 6-slot pitch while the turn portion 54 of the second electrical conductor group 51b is formed at a 4-slot pitch.

[Fourth Modification]

In the above-described embodiment, each of the electrical conductor segments 52 has a substantially rectangular cross-sectional shape (see FIG. 6).

Figure 20A:
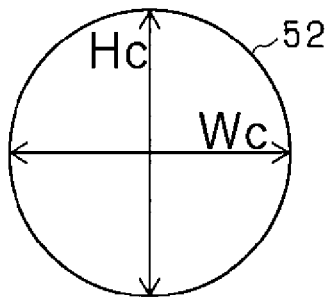
FIGS. 20A, 20B and 20C are schematic diagrams illustrating alternative cross-sectional shapes of the electrical conductor segments according to a fourth modification.
Figure 20B:
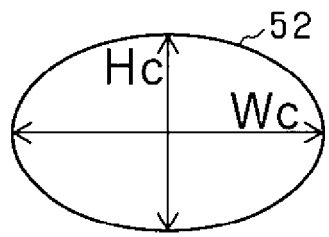
Figure 20C:
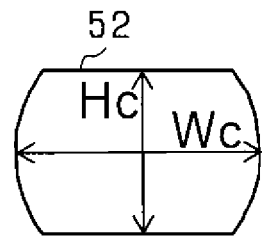

However, each of the electrical conductor segments 52 may alternatively have other cross-sectional shapes, such as a circular, elliptical or barrel-like cross-sectional shape as shown in FIGS. 20A-20C.

In addition, in the case of each of the electrical conductor segments 52 having a circular, elliptical or barrel-like cross-sectional shape, the radial thickness Hc and circumferential width Wc of each of the electrical conductor segments 52 in the corresponding slots 35 of the stator core 31 may be defined as shown in FIGS. 20A-20C. More specifically, in this case, the radial thickness Hc may be represented by the maximum radial thickness in each of the electrical conductor segments 52; and the circumferential width Wc may be represented by the maximum circumferential width in each of the electrical conductor segments 52.

[Fifth Modification]

In the above-described embodiment, the first and second electrical conductor groups 51a and 51b forming a same one of the U-phase, V-phase and W-phase windings of the stator coil 32 are connected in series with each other (see FIG. 14).

Figure 21:
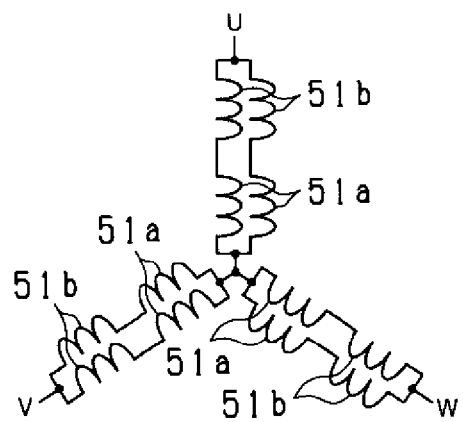
FIG. 21 is a schematic circuit diagram of a stator coil according to a fifth modification.

As an alternative, as shown in FIG. 21, each of the U-phase, V-phase and W-phase windings of the stator coil 32 may include a plurality (e.g., two in FIG. 21) of pairs of electrical conductor groups 51. The pairs of electrical conductor groups 51 are connected in parallel with each other, and each pair of the electrical conductor groups 51 consists of a first electrical conductor group 51a and a second electrical conductor group 51b that are connected in series with each other.

[Sixth Modification]

Figure 22:
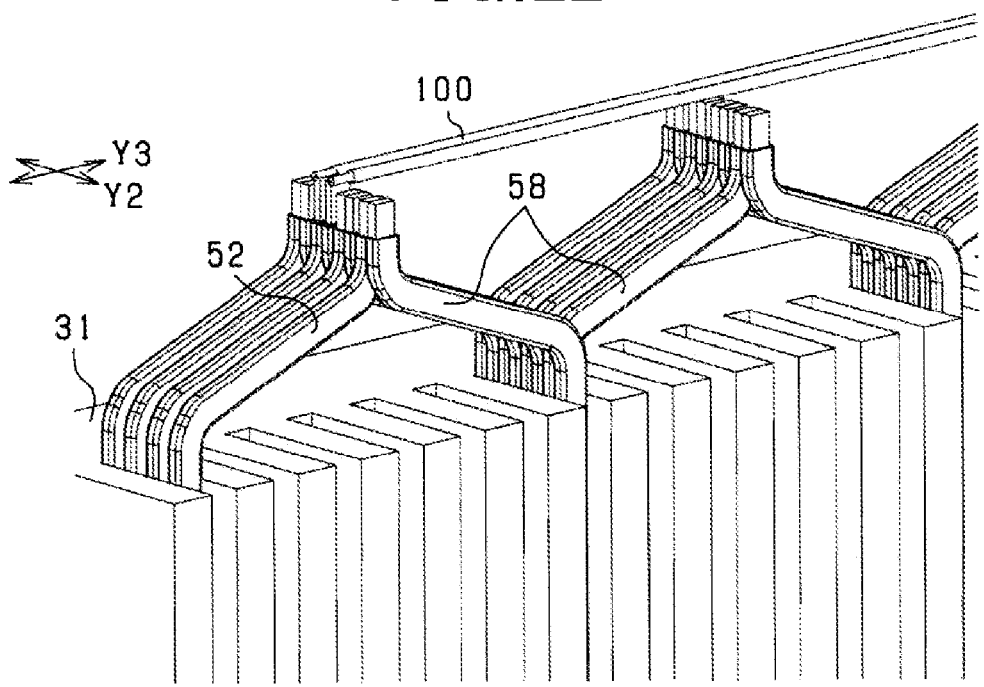
FIG. 22 is a perspective view showing bridging wires employed in a stator according to a sixth modification.

In the above-described embodiment, bridging wires may be employed to connect each corresponding pair of parts of the stator coil 32 located apart from each other in the circumferential direction; these parts may include, for example, end portions of the U-phase, V-phase and W-phase windings of the stator coil 32, a neutral terminal and U-phase, V-phase and W-phase terminals of the stator coil 32. In this case, as shown in FIG. 22, it is preferable to connect, by the bridging wires 100, those of the terminal portions 58a and 58b of the electrical conductor segments 52 of the electrical conductor groups 51 which are located radially innermost in the respective electrical conductor groups 51. Consequently, it would become possible to prevent the bridging wires 100 from protruding radially inward or radially outward from the electrical conductor groups 51, thereby suppressing increase in the radial size of the stator 30 and ensuring electrical insulation of the bridging wires 100 from the housing 20 and the rotor 40. In addition, the bridging wires 100 may share common insulating coats with the connection portions 58 (or the terminal portions 58a and 58b of the electrical conductor segments 52).

[Seventh Modification]

In the above-described embodiment, the number N of the electrical conductor segments 52 included in each of the electrical conductor groups 51 is set to 4. Moreover, the first and second electrical conductor groups 51a and 51b forming a same one of the U-phase, V-phase and W-phase windings of the stator coil 32 are connected in series with each other.

As an alternative, the number N of the electrical conductor segments 52 included in each of the electrical conductor groups 51 may be set to 3. Moreover, each of the U-phase, V-phase and W-phase windings of the stator coil 32 may include four winding units connected in parallel with each other and each consisting of one pair of the first and second electrical conductor groups 51a and 51b connected in series with each other. Furthermore, as described in the above embodiment, the slots 35 of the stator core 31 are comprised of the pairs of the same-phase slots Su1 and Su2, Sv1 and Sv2, and Sw1 and Sw2 (see FIG. 12A). Each pair of the same-phase slots consists of two circumferentially-adjacent slots 35 corresponding to a same one of the U-phase, V-phase and W-phase windings of the stator coil 32. In each pair of the same-phase slots (e.g., Su1 and Su2), there are arranged the four winding units forming the corresponding phase winding (e.g., the U-phase winding) of the stator coil 32 such that the number of the straight portions 53 of the electrical conductor groups 51 of the four winding units received in one (e.g., Su1) of the pair of the same-phase slots is equal to the number of the straight portions 53 of the electrical conductor groups 51 of the four winding units received in the other (e.g., Su2) of the pair of the same-phase slots. With the above arrangement, the four winding units can be evenly received in the pair of the same-phase slots, thereby securing electromagnetic balance and suppressing circulating current in the stator 30.

[Eighth Modification]

In the above-described embodiment, the U-phase, V-phase and W-phase windings of the stator coil 32 are star-connected together. However, the U-phase, V-phase and W-phase windings of the stator coil 32 may alternatively be Δ-connected together.

What is claimed is:

1. A rotating electric machine comprising an armature, the armature including an annular armature core and a multi-phase armature coil wound on the armature core,
wherein:
the armature core has a plurality of slots arranged in a circumferential direction thereof;
the armature coil is formed of a plurality of electrical conductor groups connected with one another, each of the plurality of electrical conductor groups being constituted of a bundle of a plurality of electrical conductor segments;
each of the plurality of electrical conductor groups is substantially U-shaped to have a pair of leg portions and a connecting portion, the pair of leg portions being respectively received in a corresponding pair of the slots of the armature core and located at different radial positions in the corresponding slots, the connecting portion extending on one axial side of the armature core to connect the pair of leg portions, the connecting portion having a bent part that is bent radially with respect to the circumferential direction;
the plurality of electrical conductor groups are paired such that each pair of the electrical conductor groups consists of a first electrical conductor group and a second electrical conductor group that both belong to a same phase of the armature coil;
a circumferential pitch between the pair of leg portions of the first electrical conductor group is greater than a circumferential pitch between the pair of leg portions of the second electrical conductor group; and
in each pair of the electrical conductor groups, the connecting portions of the first and second electrical conductor groups are arranged to axially overlap each other.

2. The rotating electric machine as set forth in claim 1, wherein:
for each of the electrical conductor groups, the electrical conductor segments constituting the electrical conductor group are arranged, at the pair of leg portions of the electrical conductor group, in a predetermined arrangement sequence in a radial direction so as to be radially aligned with each other in the corresponding slots of the armature core; and at the connecting portion of the electrical conductor group, the electrical conductor segments constituting the electrical conductor group are arranged parallel to each other keeping the arrangement sequence of the electrical conductor segments at the pair of leg portions of the electrical conductor group in the corresponding slots.

3. The rotating electric machine as set forth in claim 1, wherein:

the bent parts of the connecting portions of the first electrical conductor groups are arranged in alignment with each other in the circumferential direction;

a circumferential pitch between the bent parts of the connecting portions of the first electrical conductor groups is greater than or equal to a circumferential pitch between the slots of the armature core and less than or equal to twice the circumferential pitch between the slots;

the bent parts of the connecting portions of the second electrical conductor groups are also arranged in alignment with each other in the circumferential direction; and a circumferential pitch between the bent parts of the connecting portions of the second electrical conductor groups is also greater than or equal to the circumferential pitch between the slots of the armature core and less than or equal to twice the circumferential pitch between the slots.

4. The rotating electric machine as set forth in claim 1, wherein:

for each of the electrical conductor groups, one of the pair of leg portions of the electrical conductor group is received in a radially outer part of one corresponding slot of the armature core and the other of the pair of leg portions is received in a radially inner part of another corresponding slot of the armature core;

for each of the electrical conductor groups, there is formed, in the bent part of the connecting portion of the electrical conductor group, a radially-extending part which extends along a radial direction and in which the electrical conductor segments constituting the electrical conductor group are arranged in alignment with each other in the circumferential direction;

the radially-extending parts of the connecting portions of the first electrical conductor groups are arranged in alignment with each other in the circumferential direction, and the radially-extending parts of the connecting portions of the second electrical conductor groups are arranged in alignment with each other in the circumferential direction; and the following relationship is satisfied:

$$Rc \times 2 \times \pi/S \leq N \times Hc \leq Rc \times 2 \times \pi/(S/2)$$

where Rc is a distance from a central axis of the armature core to a radial center of each of the slots, S is the number of the slots formed in the armature core, N is the number of the electrical conductor segments included in each of the electrical conductor groups, and Hc is a radial thickness of each of the electrical conductor segments in the corresponding slots of the armature core.

5. The rotating electric machine as set forth in claim 1, wherein:

a clearance is provided between each circumferentially-adjacent pair of the bent parts of the connecting portions of the electrical conductor groups.

6. The rotating electric machine as set forth in claim 1, wherein:

for each of the electrical conductor groups, one of the pair of leg portions of the electrical conductor group is received in a radially outer part of one corresponding slot of the armature core and the other of the pair of leg portions is received in a radially inner part of another corresponding slot of the armature core; and the following relationship is satisfied:

$$Wc \times 2 < Hc \times N,$$

where Wc is a circumferential width of each of the electrical conductor segments in the corresponding slots of the armature core, Hc is a radial thickness of each of the electrical conductor segments in the corresponding slots of the armature core, and N is the number of the electrical conductor segments included in each of the electrical conductor groups.

7. The rotating electric machine as set forth in claim 1, wherein:

the armature coil is a three-phase coil having three phase windings star-connected to define a neutral point therebetween;

the first and second electrical conductor groups forming a same one of the phase windings of the armature coil are connected in series with each other; and the first electrical conductor groups are connected closer to the neutral point than the second electrical conductor groups are.

8. The rotating electric machine as set forth in claim 1, wherein:

at the connecting portions of each pair of the electrical conductor groups, an axially-inner side surface of the first electrical conductor group and an axially-outer side surface of the second electrical conductor group are arranged in surface contact with each other.

9. The rotating electric machine as set forth in claim 1, wherein:

each of the electrical conductor segments includes a main body formed of an electrically-conductive material and an insulating coat covering a surface of the main body; and the insulating coat is formed of an electrically-insulative material with voids formed therein.

10. The rotating electric machine as set forth in claim 1, wherein:

at the connecting portions of each pair of the electrical conductor groups, the electrical conductor segments constituting the first electrical conductor group are respectively axially opposed to and spaced at a substantially constant interval from the electrical conductor segments constituting the second electrical conductor group.

11. The rotating electric machine as set forth in claim 1, wherein:

each of the electrical conductor groups is constituted of a bundle of three electrical conductor segments;

the armature coil is a three-phase coil having three phase windings star-connected together;

each of the phase windings of the armature coil includes four winding units connected in parallel with each other and each including one pair of the first and second electrical conductor groups connected in series with each other;

the plurality of slots of the armature core are comprised of pairs of same-phase slots, each pair of the same-phase slots consisting of two circumferentially-adjacent slots corresponding to a same one of the phase windings of the armature coil; and in each pair of the same-phase slots, there are arranged the four winding units forming the corresponding phase winding of the armature coil such that the number of the leg portions of the electrical conductor groups of the four winding units received in one of the pair of the same-phase slots is equal to the number of the leg portions of the electrical conductor groups of the four winding units received in the other of the pair of the same-phase slots.

* * * * *